United States Patent

Obee et al.

(10) Patent No.: US 10,692,153 B2
(45) Date of Patent: Jun. 23, 2020

(54) MACHINE-LEARNING CONCEPTS FOR DETECTING AND VISUALIZING HEALTHCARE FRAUD RISK

(71) Applicant: Optum Services (Ireland) Limited, Dublin (IE)

(72) Inventors: Elizabeth Mae Obee, New Orleans, LA (US); Sheila Greene, Dublin (IE); Marcus Alan Ballard, Pelham, AL (US); Jacques Bellec, Dublin (IE)

(73) Assignee: Optum Services (Ireland) Limited, Dublin (IE)

( * ) Notice: Subject to any disclaimer, the term of this patent is extended or adjusted under 35 U.S.C. 154(b) by 14 days.

(21) Appl. No.: 16/028,668

(22) Filed: Jul. 6, 2018

(65) Prior Publication Data

US 2020/0013124 A1    Jan. 9, 2020

(51) Int. Cl.
| G06Q 40/08 | (2012.01) |
| G06N 20/20 | (2019.01) |
| G06F 3/0483 | (2013.01) |
| G06N 20/00 | (2019.01) |

(52) U.S. Cl.
CPC .......... G06Q 40/08 (2013.01); G06F 3/0483 (2013.01); G06N 20/00 (2019.01)

(58) Field of Classification Search
CPC .............................. G06Q 40/08; G06N 20/00
USPC ........................................................... 705/4
See application file for complete search history.

(56) References Cited

U.S. PATENT DOCUMENTS

| 8,930,253 | B1 | 1/2015 | Ball | |
| 9,363,148 | B2 * | 6/2016 | Somaiya | ................. H04L 41/22 |
| 9,516,052 | B1 * | 12/2016 | Chauhan | ................. G06F 16/25 |
| 9,779,407 | B2 | 10/2017 | Adjaoute | |
| 10,460,320 | B1 * | 10/2019 | Cao | ..................... G06Q 20/4016 |
| 2007/0112667 | A1 | 5/2007 | Rucker | |
| 2008/0172257 | A1 | 7/2008 | Bisker et al. | |
| 2013/0006655 | A1 * | 1/2013 | Van Arkel | ............. G06Q 10/10 |
| | | | | 705/2 |
| 2014/0058763 | A1 | 2/2014 | Zizzamia et al. | |
| 2014/0081652 | A1 | 3/2014 | Klindworth | |
| 2014/0149128 | A1 * | 5/2014 | Getchius | ................. G06Q 50/22 |
| | | | | 705/2 |
| 2014/0172445 | A1 | 6/2014 | Hajbandeh | |
| 2016/0004826 | A1 | 1/2016 | Van et al. | |

(Continued)

*Primary Examiner* — Robert R Niquette
(74) *Attorney, Agent, or Firm* — Alston & Bird LLP

(57) ABSTRACT

Machine-learning concepts for detecting and visualizing healthcare fraud, waste, and abuse risk using a data driven decision and investigations support system. The concepts comprise an analytic core that processes a large amount of data, generates an overall risk score, and ranks healthcare providers and/or members. The overall risk score is an integrated score encompassing multiple categories of risk. The multiple categories of risk factors include multiple definitions of what defines risk, allowing for a synergistic effect between the risk analytics, where the overall effect of the combination is greater than the sum of the effects of any one definition of risky behavior by a provider or member. Utilizing this approach a unique risk profile of healthcare providers and members is generated and visualized to the user. Various embodiments further encompass a user interface that comprises linked panels that display targeted information regarding providers and members.

12 Claims, 19 Drawing Sheets

(56) References Cited

U.S. PATENT DOCUMENTS

| | | |
|---|---|---|
| 2016/0004979 A1 | 1/2016 | Getchius |
| 2016/0012544 A1 | 1/2016 | Ramaswamy et al. |
| 2016/0117778 A1* | 4/2016 | Costello ................. G06N 20/00 |
| | | 705/4 |
| 2016/0259896 A1 | 9/2016 | Yang |
| 2016/0267484 A1 | 9/2016 | Smoley et al. |
| 2016/0379309 A1 | 12/2016 | Shikhare |
| 2017/0221066 A1 | 8/2017 | Ledford et al. |
| 2017/0270435 A1* | 9/2017 | Gallardo ............. G06F 17/5009 |
| 2018/0024702 A1* | 1/2018 | Noel ..................... G06F 3/0484 |
| | | 715/771 |
| 2019/0205885 A1* | 7/2019 | Lim .................... H04L 63/1483 |
| 2019/0228419 A1* | 7/2019 | Sampath ............. G06K 9/6215 |

\* cited by examiner

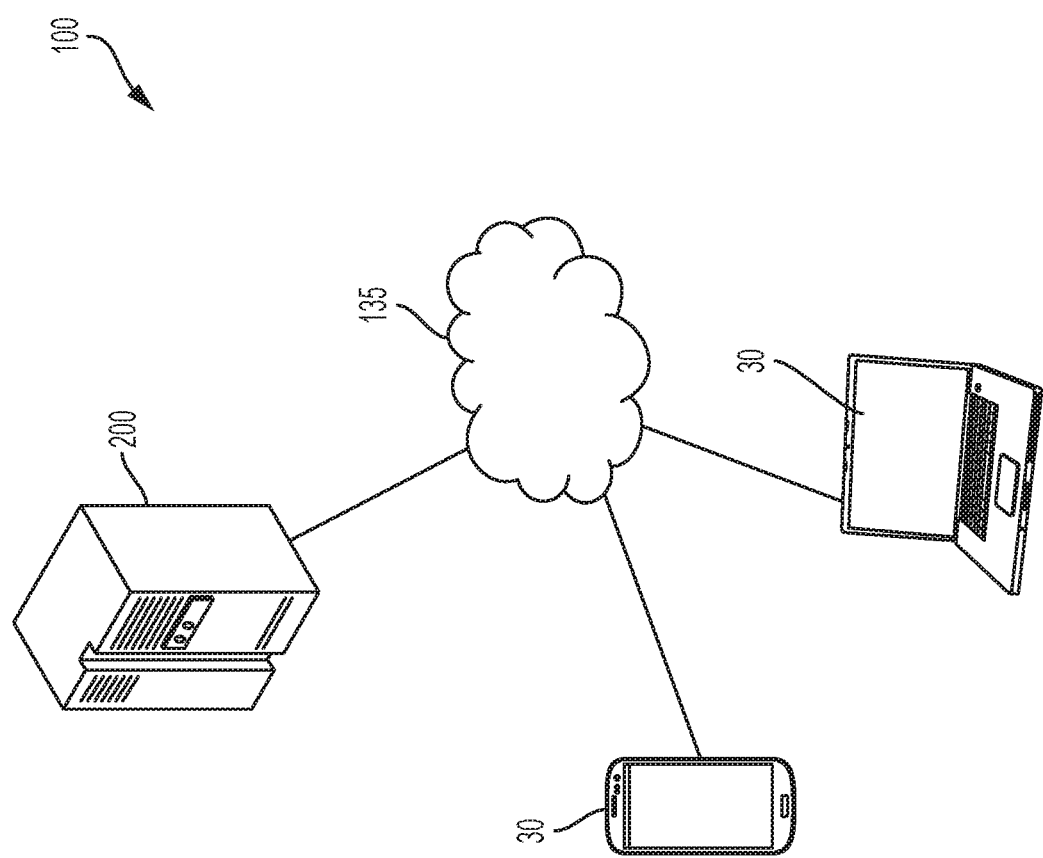

MACHINE-LEARNING CONCEPTS FOR DETECTING AND VISUALIZING HEALTHCARE FRAUD RISK

TECHNOLOGICAL FIELD

Embodiments of the present invention generally relate to machine-learning based methodologies for automatic determinations of risk scores indicative of the likelihood of healthcare transaction validity that are usable for populating enhanced user interfaces that provide improvements for navigating the data regarding the same.

BACKGROUND

Confirming the validity of healthcare transactions has historically been a highly manual process that relies on human intuition for identifying unusual transactions based on countless hours of investigation. Investigators and health insurance payers endeavoring to detect fraudulent healthcare insurance payments have traditionally relied on manual calculations and/or ad-hoc analysis functions implemented in spreadsheet software tools based on analyses of insurance claims to detect fraud. For example, investigators would undertake an intuition-based "outlier analysis" to find claims that were somehow different than other claims that a health insurance payer had received in the past.

New improved systems have emerged that provide increased volumes of data that investigators and health insurance payers must analyze in order to effectively detect fraud. It is currently impossible for investigators and health insurance payers to analyze the data effectively without the aid of more advanced systems and tools.

Therefore, there is a need for systems that can analyze large volumes of data related to healthcare insurance payments and provide enhanced visual representations of the analysis via user interfaces for efficient and quick use by investigators and healthcare insurance payers. Finally, there is a need for an integrated representation of risk that takes into account multiple risk categories in a single score and a corresponding user-friendly visualization of healthcare events that give rise to the integrated representation of risk.

BRIEF SUMMARY

A computing system, apparatus, computer-implemented method, and computer program product are provided to, in general, provide an improved analytic detection of fraud patterns from temporal interactions between separate entities that operate in the health insurance environment.

Various embodiments are directed to a computing system that includes a non-transitory computer readable storage medium and one or more processors. In these embodiments, the computing system is configured to: determine, based at least in part on a risk model trained using machine learning, a risk score for each of a plurality of providers; identify a first set of providers of the plurality of providers satisfying a risk threshold based at least in part on the respective risk scores; and identify a first set of members corresponding to each provider of the first set of providers; and generate an interactive user interface. The interactive user interface includes a first interface tab identifying each of a plurality of the risky providers, and a second interface tab identifying a temporal relationship between member interactions for a selected provider and identifying one or more risk factors based at least in part on the temporal relationship between member interactions for the selected provider, wherein the first interface tab and the second interface tab are linked.

In certain embodiments, the computing system is further configured to hierarchically rank each of the first set of providers. Moreover in various embodiments of the computing system, (a) the provider data includes data identifying claims associated with member interactions involving the provider and (b) determining a risk score for each of a plurality of providers includes retrieving member data associated with members identified within the provider data. In certain embodiments of the computing system, (a) the first interface tab is a provider lead tab and the second interface tab is a swimlanes tab, and (b) a provider indicator in the first interface tab is selectable to populate the second interface tab.

Various embodiments are directed to a computer-implemented method that includes: determining, via one or more processors, based at least in part on a risk model trained using machine learning, a risk score for each of a plurality of providers; identifying, via the one or more processors, a first set of providers of the plurality of providers satisfying a risk threshold based at least in part on the respective risk scores; identifying, via the one or more processors, a first set of members corresponding to each provider of the first set of providers; and generating, via the one or more processors, an interactive user interface. The interactive user interface includes a first interface tab identifying each of a plurality of the risky providers, and a second interface tab identifying a temporal relationship between member interactions for a selected provider and identifying one or more risk factors based at least in part on the temporal relationship between member interactions for the selected provider, wherein the first interface tab and the second interface tab are linked.

In certain embodiments, the computer-implemented method further includes: hierarchically ranking each of the first set of providers. Moreover, in various embodiments of the computer-implemented method, (a) the provider data includes data identifying claims associated with member interactions involving the provider and (b) determining a risk score for each of a plurality of providers includes retrieving member data associated with members identified within the provider data. In certain embodiments of the computer implemented method, (a) the first interface tab is a provider lead tab and the second interface tab is a swimlanes tab, and (b) a provider indicator in the first interface tab is selectable to populate the second interface tab.

Various embodiments are directed to a computer program product that includes a non-transitory computer readable medium having computer program instructions stored therein. In these embodiments, the computer program instructions when executed by a processor, cause the processor to: determine, based at least in part on a risk model trained using machine learning, a risk score for each of a plurality of providers; identify a first set of providers of the plurality of providers satisfying a risk threshold based at least in part on the respective risk scores; identify a first set of members corresponding to each provider of the first set of providers; and generate an interactive user interface. The interactive user interface includes: a first interface tab identifying each of a plurality of the risky providers, and a second interface tab identifying a temporal relationship between member interactions for a selected provider and identifying one or more risk factors based at least in part on the temporal relationship between member interactions for the selected provider, wherein the first interface tab and the second interface tab are linked.

In certain embodiments, the computer program instructions further cause the processor to hierarchically rank each of the first set of providers. Moreover, in various embodiments of the computer program product, (a) the provider data includes data identifying claims associated with member interactions involving the provider and (b) determining a risk score for each of a plurality of providers includes retrieving member data associated with members identified within the provider data. In certain embodiments of the computer program product, (a) the first interface tab is a provider lead tab and the second interface tab is a swimlanes tab, and (b) a provider indicator in the first interface tab is selectable to populate the second interface tab.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 is a diagram of a fraud detection system that can be used in conjunction with various embodiments of the present invention;

Figure 16:
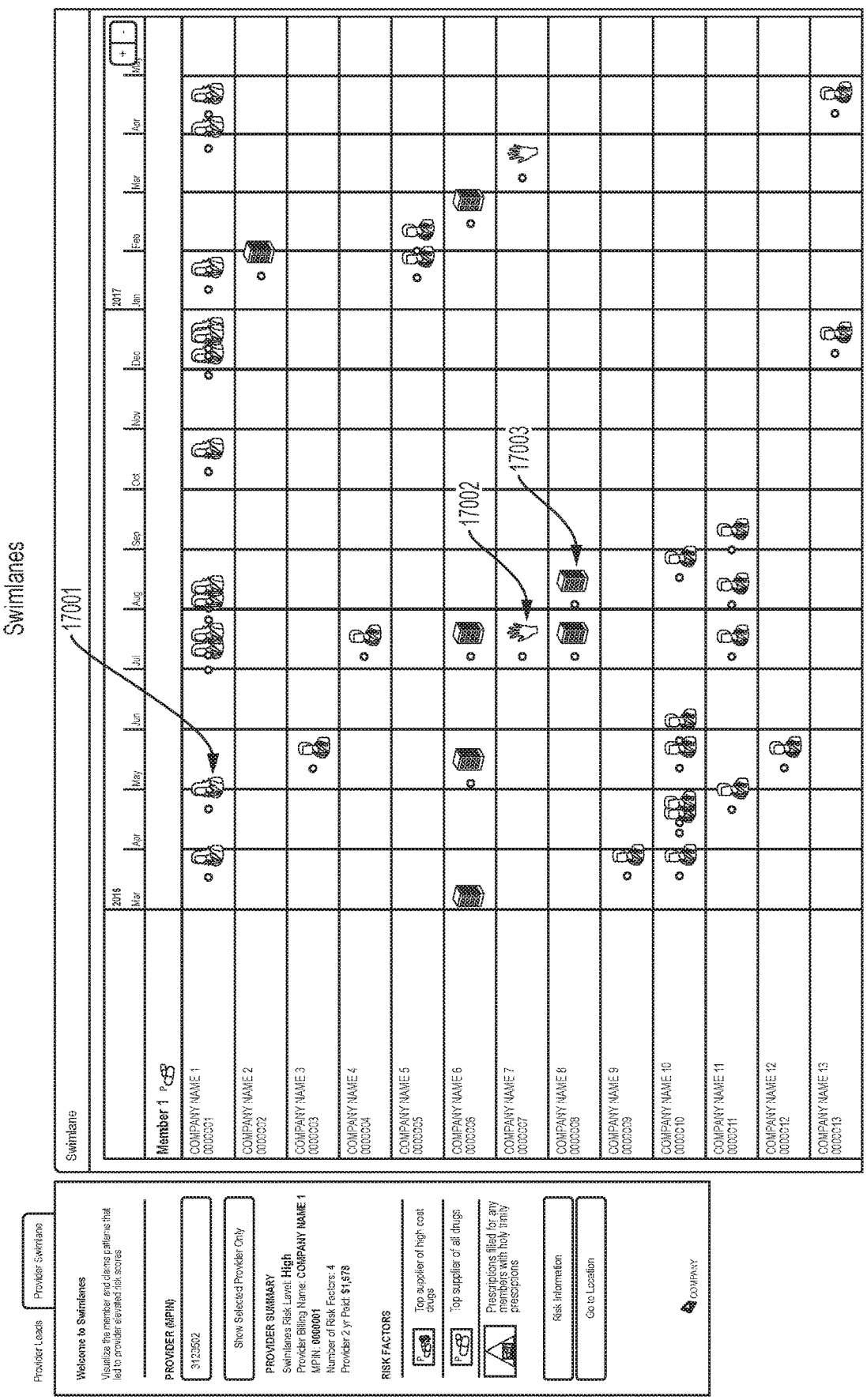
Figure 17:
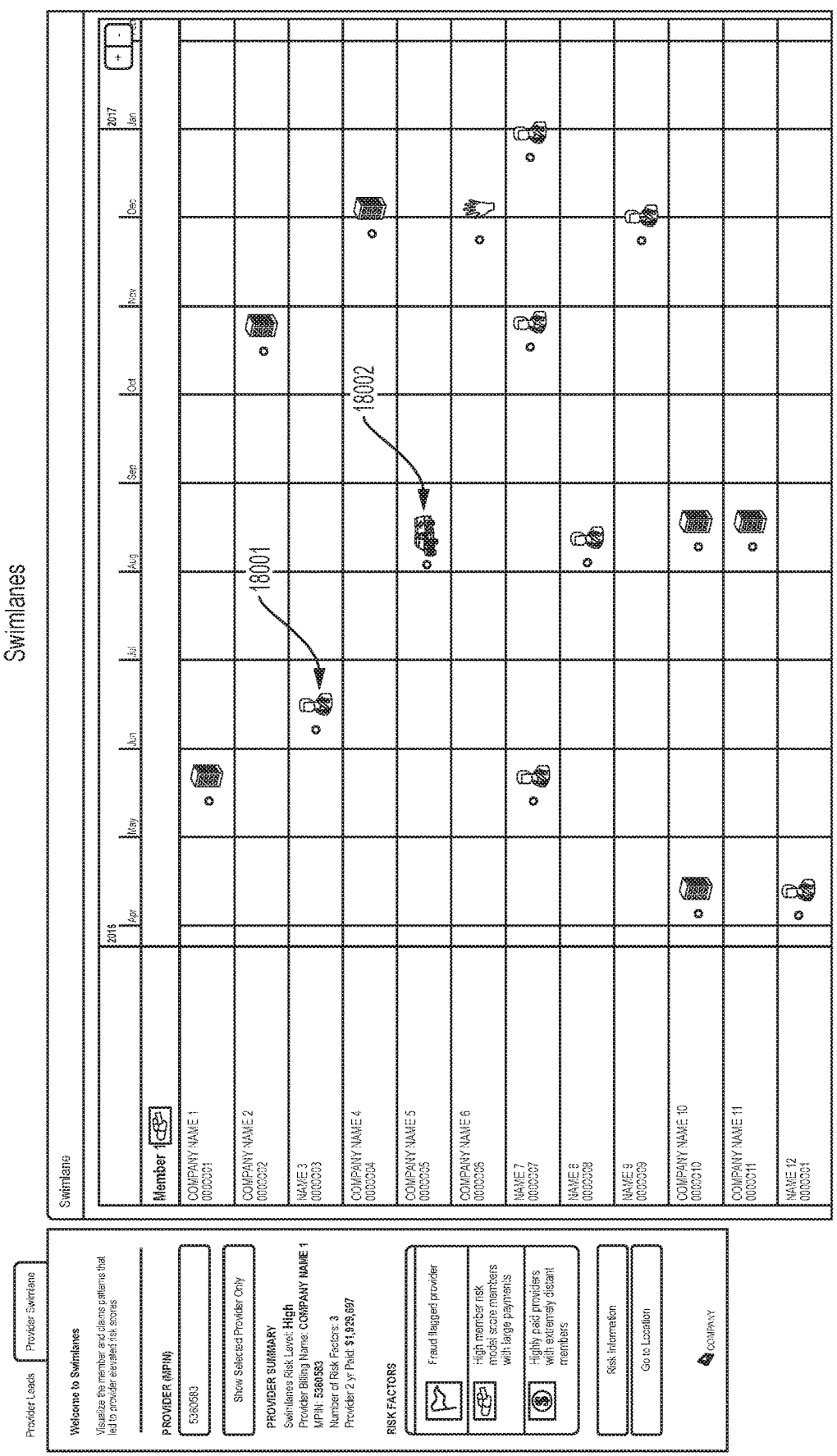
Figure 18:
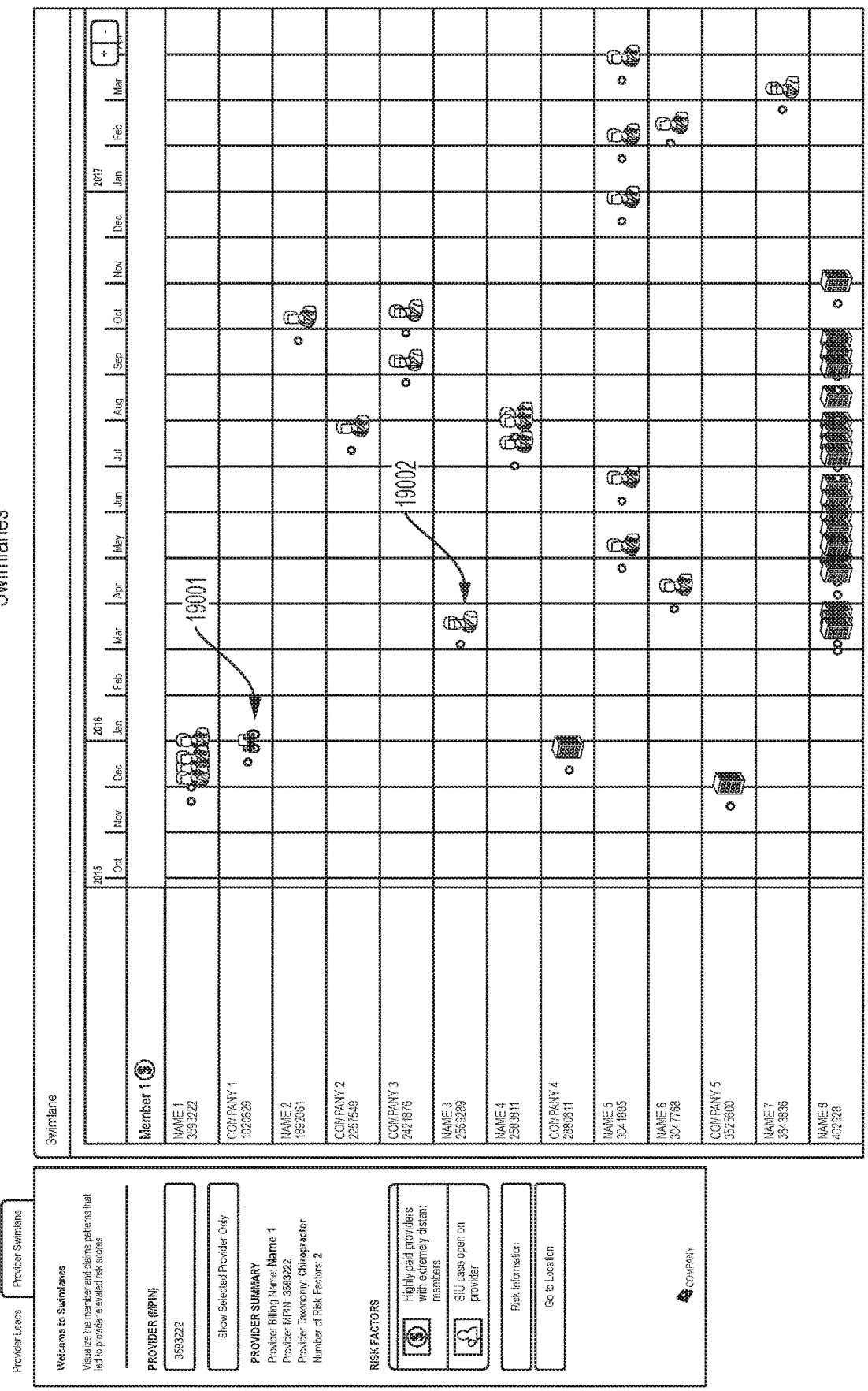

FIG. 16-18 provide additional embodiments of an interactive fraud risk user interface comprising a provider swimlanes view.

DETAILED DESCRIPTION OF SOME EXAMPLE EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

I. Exemplary Terms

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "client device" may refer to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and/or the like.

The term "user" should be understood to refer to an individual, group of individuals, business, organization, and/or the like. For example, a user may be an employee of a healthcare organization seeking access to records associated with a particular patient/member, a particular healthcare provider (e.g., physician), a particular healthcare services organization (e.g., a laboratory), and/or the like.

The terms "profile," "account," and "account details" refer to information associated with a user (e.g., patient, provider, laboratory, lab payer, etc.), including, for example, a user identifier, an email address, a real name (e.g., John Doe), a username (e.g., jdoe), a password, a time zone, a status, and/or the like. The account details can include a subset designation of user credentials, such as, for example, login information for the user including the user's username and password.

As used herein, the term "profile identifier" may refer to any data that identifies a user. For example, and without limitation, a profile identifier may include a unique identifier, an IP address, a MAC address, ASCII text, a pointer, a memory address, and/or the like.

As used herein, the term "profile data" may refer to any data associated with a profile identifier, such as, but not limited to, biographical data or any other data that may serve to characterize or describe the associated user.

As used herein, the term "biographical data" may refer to information associated with a person(s) identified in a profile, such as, for example, work location, work department, employment effective date, login credential information, and/or any other identifying information about a profile.

As used herein, the term "provider" may refer to an entity that provides services or products to members. In at least one embodiment, providers rely on a health insurance payer to finance or reimburse the cost of the services or products provided. For example, a provider may comprise a health professional operating within one or more of a plurality of branches of healthcare, including medicine, surgery, dentistry, midwifery, pharmacy, psychology, psychiatry, pain management, nursing, laboratory diagnostics, and/or the like. A provider may also comprise an organization, such as a private company, hospital, laboratory, or the like, that operates within one or more of a plurality of branches of healthcare.

As used herein, the term "member," "beneficiary," "subscriber," and/or "customer" (which may be used interchangeably) may refer to a person who receives healthcare services or products rendered by a provider and who relies on financing from a health insurance payer to cover the costs of the rendered health services or products. In that sense, the member is associated with the health insurance payer and is said to be a member of (a program associated with) the health insurance payer. Members may be associated with any of a variety of health insurance payers, such as Medicare, Medicaid, and/or private insurance providers. A member may be associated with a "fully insured" plan, an "administrative services only" plan with the employer of the member to provide claims processing services on behalf of the member, and/or the like.

As used herein, the term "health insurance payer" may refer to entities, other than a patient, that finance or reimburse the cost of health services or products. In the context of the health risk fraud system disclosed herein, the health insurance payer is affiliated/associated with a plurality of providers and members. In some embodiments, the affiliation/association may take the form of enrollment in an insurance plan wherein a health insurance payer agrees to pay at least a portion of certain medical costs incurred by a member in exchange of receiving other payments from the member (e.g., monthly payments and, potentially, a deductible per claim). Similarly, the affiliation/association may take the form of an agreement between a health insurance payer and a provider in which the provider agrees to accept patients covered under an insurance plan supplied by the health insurance payer in exchange of the health insurance payer referring patients to the provider and covering the cost of health services and products rendered by the provider. The person of ordinary skill would recognize that variations of these affiliations/associations are contemplated within this definition, and the affiliations/definitions described in this definition are provided only for illustrative purposes.

As used herein, the term "risk factor" may refer to one or more items of data that are used as an indicator of the potential presence of fraud, waste, error, or otherwise aberrant and unusual claims. A risk factor is the product of any type of flag, algorithm, or analytic that is applied to a set of healthcare data associated with a provider or member. In some embodiments, a risk factor may be used to obtain a subset of providers or members, wherein the subset comprises those providers or members that meet the criterion or criteria of the flag, algorithm, or analytic.

As used herein, the term "machine-learning model" is a self-generated evolutionary update to an initially provided machine-learning algorithm that has evolved as a result of a training process. The training process involves providing a machine-learning algorithm with training data, which contains the correct answer for the answer that the machine-learning model is to eventually predict. The machine-learning algorithm finds patterns in the training data that map the input data attributes to the target (e.g., the answer that the machine-learning model is to eventually predict), and it outputs the machine-learning model that captures these patterns. The resulting machine-learning model may generate data indicative of predictions on new data for which the target is unknown.

For example, in the context of embodiments of the present invention disclosed herein, a machine-learning model may be used by the healthcare fraud risk system to predict whether healthcare data associated with a member or provider indicates that the member or provider is involved in fraudulent activity. In this context, the training data contains, for each of the providers and members included therein, the correct answer for whether the provider or member was involved in fraudulent activity. Thus, when actual data is presented to the machine-learning model, the machine-learning model identifies similarities with the training data, and generates a risk score indicative of the degree of similarity between the actual data and training data deemed indicative of fraudulent activity (specifically, indicative of the level of similarity between the actual data and data associated with fraudulent activity). It should be understood that actual data may be later converted to training data to further evolve the machine-learning model for future analyses.

As used herein, the terms "risk score" and "overall risk score" may refer to one or more items of data that are used as an indicator of the potential presence of fraud and that is based one or more risk factors. An overall risk score is the product of a model that considers the presence of the one or more risk factors in order to output a quantifier representative of the likelihood that a provider or member is involved in fraudulent activity.

As a non-limiting example, in some embodiments, the model may be a machine-learning model that has been trained with a data set. The data set comprises information regarding healthcare insurance claims associated with providers and members that have been designated as either "fraudulent" or "non-fraudulent." Because the machine-learning model develops fraud-recognition patterns based on the data, the overall risk score of certain embodiments is based on fraud recognition patterns more advanced, complex, and accurate than a human analyst may implement. For example, in some embodiments, given a particular combination of risk factors, the machine-learning model may identify an overall risk score that is significantly elevated as compared to what otherwise would be expected based on the aggregate risk corresponding to the individual risk factors. Because of the adaptable recognition patterns that are automatically generated as the machine-learning algorithm is trained, the machine-learning model may be configured to capture the likelihood that fraud is present with a high degree of accuracy. In other words, a more accurate estimate of the likelihood of fraud given a particular combination of risk factors may be lower or higher than predicted by other methods, such as the methods employed by human analysts. The overall risk score disclosed herein captures that increased accuracy.

The overall risk score may be output in many forms, for example it may be output as a probability that fraud is present, as a percentile score on a scale of 0-100, as a decile score on a scale of 0-10, and/or the like. A person of ordinary skill in the art would recognize that other methods could be used for representing the overall risk score.

As used herein, the term "provider classification" may refer to a subset type to which a provider belongs and which identifies the type of healthcare service or product that the provider renders for members. For example, a provider may be classified as belonging to a subset of providers who provide services or products associated with psychiatry, pain management, laboratory diagnostics, internal medicine, acupuncture, neurological surgery, clinical medical laboratory, etc.

As used herein, the term "provider identifier" may refer to one or more items of data by which a provider may be identified in the healthcare fraud risk system. For example, a provider identifier may comprise a code, ASCII text, a numerical string, a pointer, a memory address, and/or the like. Common provider identifiers may include a National Provider Identifier (NPI) number, the Taxpayer Identification number, internal provider identifiers used by claims processing systems, names of providers, and/or the like.

As used herein, the term "member identifier" may refer to one or more items of data by which a member may be identified in the healthcare fraud risk system. For example, a provider identifier may comprise a code, ASCII text, a numerical string, a pointer, a memory address, and/or the like. Common member identifiers may include member identifiers that are also accessible in claims platforms and/or corporate (e.g., employer) databases to recognize an individual. For example, a member identifier may comprise an individual's given name and/or social security number, or some portion of this information, to identify a particular member as a unique individual.

As used herein, the term "risk factor count" may refer to one or more items of data that quantify the number of risk factors contributing to an overall risk score. In a simple example, if a healthcare data set corresponding to a provider is processed by a plurality of rules and the data set meets the criteria for five of the plurality of rules, then the risk factor count for the provider would be five. In this simple example, each of the plurality of rules is assumed to output a binary score which is positive (e.g., "true" or 1 or the like) if the data set meets the criterion for the rule in question or negative (e.g., "false" or 0 or the like) if the data set does not meet the criterion for the rule. A person of ordinary skill in the art would recognize that the plurality of rules may output values in a form other than binary, and in such a case, the risk factor count may depend on the output value meeting certain criteria—such as exceeding a predefined threshold value.

As used herein, the term "risk level" may refer one or more items of data that describe or classify the likelihood that a provider or member is involved in fraudulent activity. For example, in one embodiment, the healthcare fraud risk system attributes to a provider or member a risk level of "high," "medium," or "low," based on the provider's or member's overall risk score. To provide further context, if the overall risk score is represented as a percentile, then a "high" risk level would indicate that a member or provider has an overall risk score that is higher than the majority of the total set of members or providers. Various embodiments may be implemented with different threshold values (for the overall risk scores) for each of the risk levels.

As used herein, the term "event indicator" may refer to one or more items of data such as an object, icon, image, symbol, shading, color hue, or the like, which the healthcare fraud risk system presents in an interactive fraud risk user interface. An event indicator provides a visual representation regarding events related to a claim or claims filed with the healthcare insurance payer on behalf of a member or a provider. In at least one embodiment, an event indicator represents a claim itself, where the claim comprises a reimbursement request for rendering services (e.g., a surgical procedure, a consultation, blood testing, etc.) or products (e.g., medical devices, drugs, etc.) from a provider to a member. In at least one embodiment, an event indicator or a plurality of event indicators may be the result of processing a healthcare data set that was input into the healthcare fraud risk system for analysis.

As used herein, the term "death event indicator" may refer to one or more items of data such as an object, icon, image, symbol, shading, color hue, or the like, which the healthcare fraud risk system presents in an interactive fraud risk user interface. A death event indicator provides a visual representation of information related to the death of a member. For example, in one embodiment, a death event indicator comprises a color in a timeline presented in an interactive fraud risk user interface, wherein the color. The death indicator may be used in conjunction with a timeline and/or other visual indicators in the interactive fraud risk user interface to determine whether certain events have occurred in relation to the time of a member's death.

As used herein, the term "death event shading" may refer to one or more items of data such as a color hue, or the like, which the healthcare fraud risk system presents in an interactive fraud risk user interface. A death event shading provides a visual representation of the time span during which a member has been dead. The death event shading may be used in conjunction with a timeline and/or other visual indicators in the interactive fraud risk user interface to determine whether certain events have occurred in relation to the time of a member's death.

As used herein, the term "pharmacy event indicator" may refer to one or more items of data such as an object, icon, image, symbol, shading, color hue, or the like, which the healthcare fraud risk system presents in an interactive fraud risk user interface. A pharmacy event indicator provides a visual representation regarding the occurrence of an interaction between a member and provider that is classified as a pharmacy and/or that dispenses pharmaceutical medication to a member. For example, in some embodiments, a pharmacy event indicator may indicate that a provider dispatched a prescription drug to a member. Moreover, pharmaceutical distribution via a pharmacy, or other ancillary services that accompany primary care provided by a provider may be attributable to a particular member and/or provider to provide a holistic view of care practices provided to one or more members under the direction of one or more providers.

As used herein, the term "swimlanes timeline" may refer to a graphical representation on an interactive fraud risk user interface of the passage of time and which presents events in the order in which they occurred. For example, in one embodiment, the swimlanes timeline presents a linear representation that is subdivided into equal portions, which may represent a month of a year. Thus, events presented within any of those portions would properly be represented as having occurred during the month and year corresponding to the subdivision of the swimlanes timeline. In certain embodiments, the granularity of the swimlanes timeline may be adjustable (e.g., such that each unit is optionally selectable to be a year, a month, a week, a day, and/or the like), for example, based on user input utilizing+/−controls displayed via the user interface to zoom in or out from a timeframe of interest.

As used herein, the terms "interface," "interactive fraud risk user interface," and similar words used herein interchangeably may refer to a main window or main interface component that is rendered in a display of a healthcare fraud risk system. The interactive fraud risk user interface is configured to display at least two interface tabs that, upon being actuated by a user, provide two different views: a provider leads view/panel/tab/portion and a provider swimlanes view. The interactive fraud risk user interface is thus configured to display, among other things, a visual representation of an overall risk score associated with providers or members, providers and members in an order based on their respective overall risk scores, and a summary of other attributes and healthcare data associated with providers and members. The interactive fraud risk user interface also provides a visual representation of events via various indicators such as death event indicators, pharmacy event indicators, or the more general event indicators. The interactive fraud risk user interface is further configured to enable user input that facilitates a user to manipulate the information presented so as to enable focused analysis and comparison of the displayed information. For example, the interactive fraud risk user interface enables user input that, among other things, causes an adjustment in the time range covered by a swimlanes timeline, an adjustment in the risk factors represented in the presented providers or members, and a filtering of the presented providers based on a plurality of criteria.

As used herein, the term "provider leads view" may refer to a tabbed panel or dedicated interface component that is rendered in a display of a healthcare fraud risk system and forms part of a main window—the interactive fraud risk user interface. The tabbed panel provides a graphical control element that allows various views or panels to be contained within a single interface or window. The provider leads view/panel/tab/portion is configured to display a plurality of providers and their associated overall risk scores. The provider leads view/panel/tab/portion displays providers in an order based on the overall risk scores. Further, the provider leads view/panel/tab/portion is configured to display other attributes related to each of the presented providers such as, for example, a risk level, a provider identifier, a provider classification, a location, a risk factor count, the types of risk factors triggering the risk factor count, an amount billed to a health insurance payer, a dollar amount received from a health insurance payer, a number of claims filed with a health insurance payer, and a number of members associated with the provider. The provider leads view/panel/tab/portion is also configured to enable user input that facilitates a user to manipulate the information presented. For example, the provider leads view/panel/tab/portion enables user input that, among other things, enables a user to search providers by name or provider identifier, enables a user to select one provider for further analysis, causes a filtering of the presented providers based on a plurality of criteria such as state, provider type, or any other filter choice, select one or more risk factors of interest to display provider leads based upon, adjust the number of providers displayed in one view, and so on.

As used herein, the term "provider swimlanes view" may refer to a tabbed panel or dedicated interface component that is rendered in a display of a healthcare fraud risk system and forms part of a main window—the interactive fraud risk user interface. As indicated above, the tabbed panel provides a graphical control element that allows various views or panels to be contained within a single interface or window. The provider swimlanes view/panel/tab/portion is configured to display a plurality of members associated with a particular provider. Thus, in one display, all of the members displayed in a provider swimlanes view/panel/tab/portion are associated with a provider. The association with a provider may comprise of, for example, the provider dispensing drugs to the member or the provider rendering healthcare services to the member. In addition to displaying one or more members associated with the provider, the interface may display data indicative of all providers, or some proportion of other providers that have submitted claims for the same member within the view. Such configurations enable identification of one or more relationships across members for a provider, if any temporal or other associations exist, as well as relationships with other providers that also treat and/or submit claims for the same members. For example, if a referring provider for a laboratory was providing medical treatment to the members that they referred for laboratory services, then data indicative of the referring provider appears in the swimlanes view on the basis of the claims for the services the referring provider rendered to the member. These claims may be displayed as separate and distinct from the laboratory claim for additional services where the claims were reported as the referring provider. In certain embodiments, the interface has the option to present only provider information for the target provider, or for all providers that have seen the member, and the interface may be configured to selectably toggle between the two views. In some embodiments, the members are displayed in an order based on the members' overall risk scores. The provider leads view/panel/tab/portion is also configured to display events in a swimlanes timeline providers in an order based on the overall risk scores. Further, the provider leads view/panel/tab/portion is configured to display other attributes related to each of the presented members such as, for example, a member identifier, a member name, and the types of risk factors associated with the member. The provider leads view/panel/tab/portion is also configured to enable user input that facilitates a user to manipulate the information presented. For example, the provider leads view/panel/tab/portion enables user input that, among other things, enables a user to expand or contract the time presented by the swimlanes timeline and filter members based on risk factors. Moreover, selection of a claim event displayed within the interface directs the interface to display details related to that claim below the temporal view. Additionally, in certain embodiments a selection option is available to see all claims, with a download option to export either individual claims or all claims.

II. General Overview

Healthcare claims overpayments can be classified into fraud, waste, abuse, and/or the like. Waste is a category that consists of events that could possibly be accidental on the part of the provider submitting the claim. It may include issues such as duplicate claims for the same service, and unbundling of services where multiple procedures codes for higher total reimbursement are submitted where a single claim would have been considered the correct category for the services rendered. Abuse is a category where the provider is suspected of engaging in deliberate tactics to maximize reimbursement, including upcoding of procedure codes to higher reimbursement levels than what was merited by services rendered or the condition of the patient. The provider in some cases may feel entitled to the additional reimbursement and feel like the claims payment guidelines are "not fair" or do not accurately represent the complexity of services the provider performs. Regardless of the merits or lack thereof regarding the sentiments of the provider, any billing that is not in accordance with policy and guidelines regarding reimbursement may constitute an overpayment that can possibly be classified as waste or abuse, with contractual obligations by both parties to adjust the reimbursement amount from that requested.

The final category of overpayment is considered fraud, sometimes referred to as "true fraud," representing situations where there is no valid medical situation that would possibly explain the provider behavior. This may include the submission of claims for services not rendered, extra services that were never performed, services that were performed on a person who was not the covered member, services performed by a person who is not a valid medical provider, services for a non-covered procedure that is submitted as some alternate service, or billing for an entire encounter which never happened. In some cases, the provider themselves may not even exist, and may be receiving mail at a P.O. Box or other location. In some cases, identity theft of members or providers may be involved. The contractual requirements and guidelines regarding claims payment in these case are supplemented with additional legal requirements that may result in referral to government entities for criminal prosecution of providers, particularly where they may have defrauded government payor programs. Fraudulent medical claims may also result in civil litigation between insurance payors and providers relevant to the discrepancies in expected accounts receivables on behalf of each party.

Embodiments of the present invention provide analytic detection of fraud patterns from temporal interactions between the separate entities that operate in the health insurance environment (e.g., providers, pharmacies, and members) and any significant events (e.g., medical visits, episodes of care, pharmacy prescriptions, drug dispensing, member death). The analytic core logic provides a user—e.g., a health insurance payer—with a single measure of risk associated with multiple suspicious interactions between healthcare providers and users over time. A visualization component provides the user with a means to visually observe the patterns of behavior identified.

Embodiments of the present invention may include an interactive fraud risk user interface, which is a user interface that offers a means to visually communicate and allow the user to interact with the results provided by the analytic core logic, provides analysis over a time series, solves the complex problem of aggregating data indicative of various risk characteristics and displaying a large amount of claims, and displays interactions and member life events in a single view.

One of the many benefits that embodiments of the present invention confer may include the provision of a comprehensive process to simultaneously detect and display suspicious healthcare providers and interactions that offer a risk to a health insurance payer (including, but not limited to financial costs, criminal acts and member heath).

a. Technical Problem to be Solved

Many fraudulent health insurance payments remain undetected by current systems. Using current systems, it is not possible to obtain an integrated view of risk across multiple overpayment categories using a single score with a corresponding visual representation of related healthcare events. Thus, investigators, health insurance payers, and/or other users of prior systems have been traditionally required to perform manual calculations and/or implement ad-hoc analysis functions via spreadsheet software tools after simple intuition is utilized to identify transactions that warrant further investigation. Although new improved systems have emerged that provide increased volumes of data that investigators and health insurance payers can analyze in order to effectively detect fraud, these new systems do little to harmonize the various new information and/or data sources in such a way as to effectively and/or automatically detect potentially fraudulent transactions.

b. Technical Solution

Embodiments of the present invention address the above technical problems, at least in part, by generating a comprehensive and integrated view of risk across multiple fraud schemes in one overall risk score. Previous analytic schemes failed to provide a cohesive view of potential fraud risk across possible fraud sources, schemes, and/or the like.

To do so, embodiments of the present invention provide analytic detection of fraud patterns from temporal interactions between the separate entities that operate in the health insurance environment (e.g., providers, pharmacies, and members) and any significant events (e.g., medical visits, pharmacy prescriptions, drug dispensing, member death). The analytic core logic provides a user (health insurance payer) with a single measure of risk associated with multiple suspicious interactions between healthcare providers and members over time. Embodiments enabling systems to visually communicate and allow the user to interact with the results analysis over a time series solve the complex problem of aggregating risk and displaying a large amount of claims, interactions and member life events in a single view.

Further, the visualization tool (e.g., interface) is configured for seamless toggling between display views/panels/tabs presenting events (e.g., insurance claims or claims data) associated with a provider of interest and the lead list comprising a plurality of providers. Thus, the tool provides a cohesive user interface that enables investigators to visualize and analyze vast amounts of healthcare information quickly and with a reduced number of calculations and analysis procedures. The efficiency and reduced demands on the computing infrastructure were not previously possible in the art. Prior user interface technologies did not enable providers to visualize the relevant information in the manner implemented by embodiments of the invention.

For example, the visualization tools are configured for toggling between filtered display views/panels/tabs of information and unfiltered display views/panels/tabs of information. These features similarly enable investigators to consider potentially relevant healthcare information quickly and with a reduced number of calculations and analysis. The importance of these benefits is compounded in a big data environment such as presented by the healthcare insurance claims data.

Other improvements conferred by embodiments of the present invention include, for example, providing embodiments to visualize a member's medical history and life events (e.g., death) across providers, the ability to compare multiple member histories, the ability to identify the risk associated with interactions between providers and members through medical services and prescriptions, and the ability to have a more comprehensive and integrated view of the risk.

The components of the risky behavior can be broken down to the claim level, represented on a timeline, which, in conjunction with the other features of embodiments of the present invention, allows the results of complex analytic processes (e.g., risk score detection) to be communicated in a way that is understandable and actionable by the user by providing all the key pieces of insight and data.

Embodiments of the present invention also provide a warning system for suspicious provider, member, and pharmacy behavior, and a list of providers that are associated with potentially high risk of involvement in fraudulent activity. The visualization of the list of risky providers enables users to, by the click of a button (user interface element, and/or the like), view the claims from which the lead (e.g., a selected risky provider included in the list of risky providers) was generated.

Additionally, the system provides for a modular design that allows for the implementation of additional risk factors/flags to be added. For example, additional models, algorithms, and/or analytics may be added to the system configuration (e.g., by providing such new models, algorithms, and/or analytics within a memory with appropriate formatting to enable usage of the newly added models, algorithms, and/or analytics). These newly added models, algorithms, and/or analytics may be incorporated into a newly generated risk ranking model that provides an overall risk rank for a particular provider, considering previously included and newly added models, algorithms, and/or analytics.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAIVI), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 provides an illustration of a fraud detection system 100 that can be used in conjunction with various embodiments of the present invention. As shown in FIG. 1, the fraud detection system 100 may comprise one or more computing systems 200, one or more user computing entities 30, one or more networks 135, and/or the like. Each of the components of the system may be in electronic communication with, for example, one another over the same or different wireless or wired networks 135 including, for example, a wired or wireless Personal Area Network (PAN), Local Area Network (LAN), Metropolitan Area Network (MAN), Wide Area Network (WAN), and/or the like. Additionally, while FIG. 1 illustrate certain system entities as separate, standalone entities, the various embodiments are not limited to this particular architecture.

a. Exemplary Computing Entity

Figure 2A:
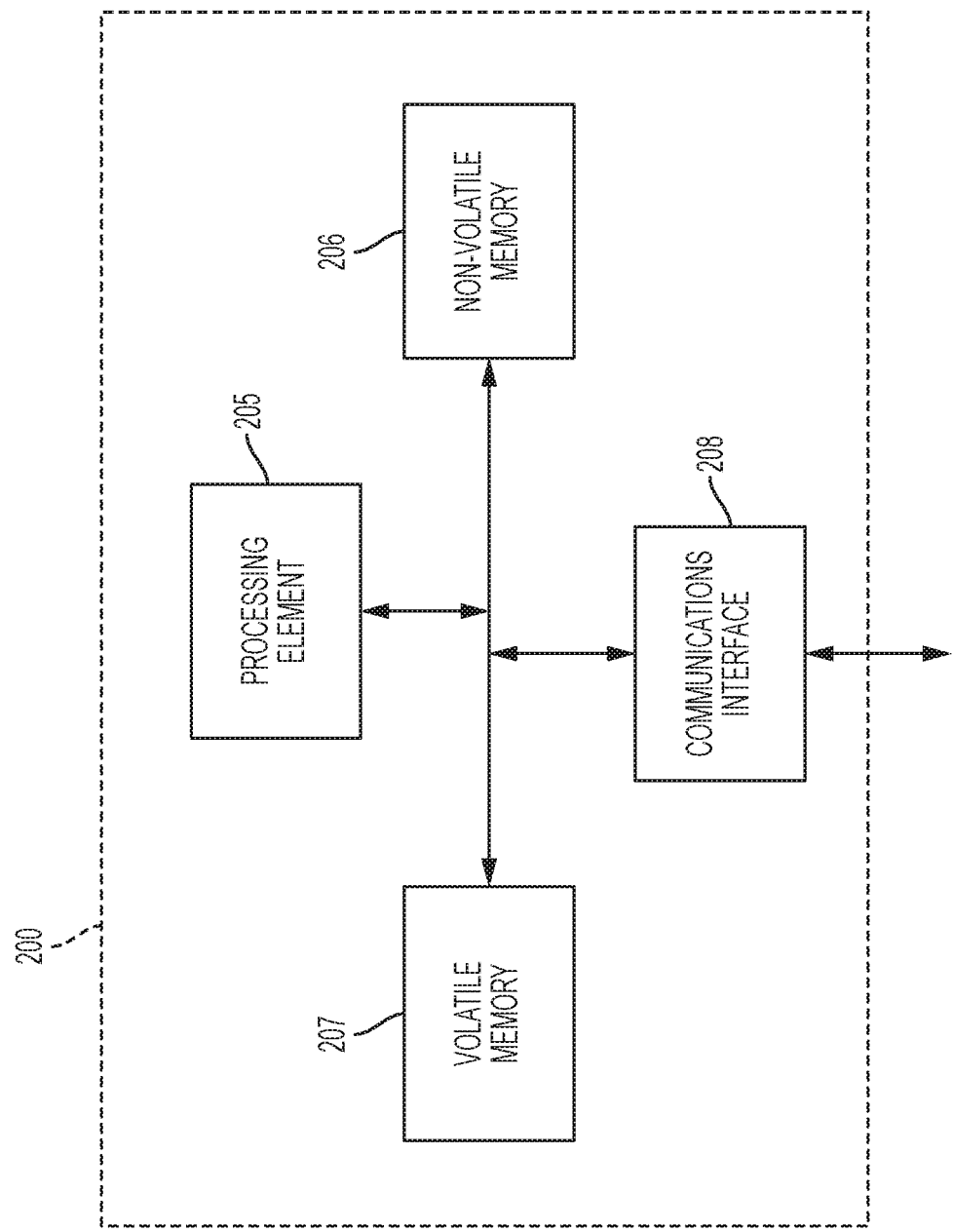
FIG. 2A is a schematic of a computing entity in accordance with certain embodiments of the present invention.

FIG. 2A provides a schematic of a computing system 200 according to one embodiment of the present invention. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the computing system 200 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the computing system 200 may communicate with other computing systems 200, one or more user computing entities 30, and/or the like.

As shown in FIG. 2A, in one embodiment, the computing system 200 may include or be in communication with one or more processing elements 205 (also referred to as processors, processing circuitry, and/or similar terms used herein interchangeably) that communicate with other elements within the computing system 200 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the computing system 200 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 206 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

Memory media 206 may also be embodied as a data storage device or devices, as a separate database server or servers, or as a combination of data storage devices and separate database servers. Further, in some embodiments, memory media 206 may be embodied as a distributed repository such that some of the stored data is stored centrally in a location within the system and other data is stored in one or more remote locations. Alternatively, in some embodiments, the distributed repository may be distributed over a plurality of remote storage locations only. An example of the embodiments contemplated herein would include a cloud data storage system maintained by a third party provider and where some or all of the data required for the operation of the fraud detection system may be stored. As a person of ordinary skill in the art would recognize, the data required for the operation of the fraud detection system may also be partially stored in the cloud data storage system and partially stored in a locally maintained data storage system.

Memory media 206 may include information accessed and stored by the fraud detection system to facilitate the operations of the system. More specifically, memory media 206 may encompass one or more data stores configured to store data usable in certain embodiments. For example, as shown in FIG. 2B, databases encompassed within the memory media 206 may comprise claims data 211, member data 212, provider data 213, output data, and/or the like.

Figure 2B:
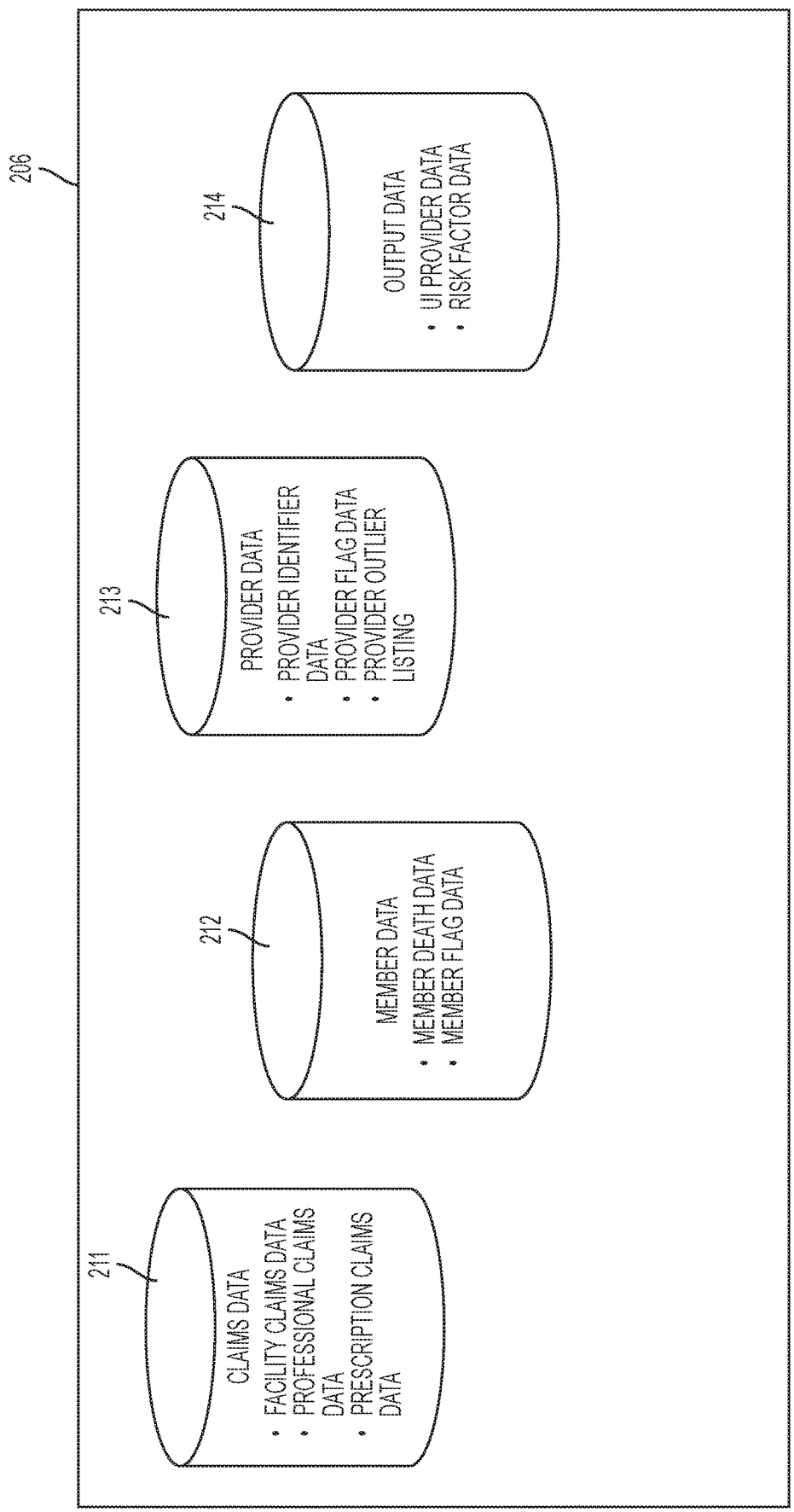
FIG. 2B is a schematic representation of a memory media storing a plurality of repositories, databases, and/or relational tables.

As illustrated in FIG. 2B, the claims data may comprise facility claims data indicative of claims filed on behalf of a healthcare facility for services or products provided by the facility. Examples of a facility include, but are not limited to, hospitals, urgent care centers, diagnostic laboratories, and/or the like.

The claims data 211 may further comprise professional claims data indicative of claims filed on behalf of a healthcare professional for services or products that the professional provided to a patient. Examples of a healthcare professional include medical doctors, nurse practitioners, physician assistants, and other medical professionals practicing in one or more of a plurality of medical specialties (e.g., psychiatry, pain management, anesthesiology, general surgery, emergency medicine, etc.). Moreover, the claims data 211 may further comprise prescription claims data indicative of claims filed on behalf of pharmacies or pharmaceutical providers. The prescription claims data may be used to extract information such as the identity of entities that prescribe certain drugs and the pharmacies who fulfill such prescriptions.

Memory media 206 may include other data stores that store information used by the fraud detection system. For example, member data 212 stored by the data store may comprise member death data indicative of the identity of dead members, such as their name, date of birth, date of death, and other identifying information such as a social security number. The member data 212 may be populated with data provided by, for example, the Social Security Administration. For example, the Social Security Administration may publish or distribute a death master file including death records of Americans on a periodic basis. In one embodiment, the member death data is based at least in part on such death master file. An ordinarily skilled practitioner would understand that other sources of death records exist and embodiments of the invention are not limited to the death master file distributed by the Social Security Administration.

The member data 212 may also comprise member flag data indicative of the identity of various members that have been flagged and/or otherwise identified as being of high risk and/or interest. The flags may be set by an investigative team (e.g., manually) or based on other machine-learning models, algorithms, or analytics (e.g., automatically), as various examples. For example, when an investigative team opens a case to investigate a specific member, the fraud detection system generates a table entry associated with such a member and creates an association with an indicator conveying that the member is involved in an ongoing investigation. Similar flags may be generated for providers, as indicated herein. Creating such a flag in the fraud detection system similarly generates a table entry associated with the flagged member and creates an association therein with an indicator conveying that such a provider has been associated with fraudulent activity. The flag and case data may include further details regarding the members, the providers, the flag, the investigation, the associated risk scores, and/or the like.

Moreover, the data stores may comprise provider data 213 having identifying information indicative of various providers. For example, the provider data 213 may comprise a provider identifier, used to convert provider identifiers that are used within the fraud detection system to provider identifiers used externally (for example, to a National Provider Identifier, or NPI, which may be a legally required unique identification number for healthcare providers that is used at a national level). The provider data may further comprise provider flag data providing an indicator conveying that the provider is involved in an ongoing investigation, similar to the member flag data discussed above. Moreover, the provider data may comprise provider outlier data comprising a listing of providers satisfying outlier criteria, such as being included in a list generated based at least in part e.g., on a list distributed by the Center of Medicare and Medicaid Services (CMS) that identifies outlier drug prescribers at the national level. Accordingly, as indicated in FIG. 2B, the provider data may comprise data retrieved from one or more external sources, such as a CMS Prescribing Outlier list, an SSA Death Master File, NPI data, and/or other external provider data sources.

The data stores may additionally comprise output data 214 comprising data accessed and/or referenced by the fraud detection system and holding output scores from models, algorithms, processing steps, and/or the like. For example, the output data may comprise UI provider data comprising values related to providers including an overall risk score and hierarchical ranking for each provider. The output data may further comprise risk factor data comprising, for example, text descriptions for each of the risk factors, which are referenced and presented to users of the fraud detection system. A person having ordinary skill in the art would understand that other similar data may be stored in memory media 206 to hold data necessary for the operation of the fraud detection system.

In one embodiment, the computing system 200 may further include or be in communication with volatile media (also referred to as volatile storage, memory, memory storage, memory circuitry and/or similar terms used herein interchangeably). In one embodiment, the volatile storage or memory may also include one or more volatile storage or memory media 207 as described above, such as RAM, DRAM, SRAM, FPM DRAM, EDO DRAM, SDRAM, DDR SDRAM, DDR2 SDRAM, DDR3 SDRAM, RDRAM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 308. Thus, the databases, database instances, database management system entities, data, applications, programs, program modules, scripts, source code, object code, byte code, compiled code, interpreted code, machine code, executable instructions, and/or the like may be used to control certain aspects of the operation of the computing system 200 with the assistance of the processing element 205 and operating system.

As indicated, in one embodiment, the computing system 200 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the computing system 200 may communicate with computing entities or communication interfaces of other computing systems 200, user computing entities 30, and/or the like.

As indicated, in one embodiment, the computing system 200 may also include one or more network and/or communications interfaces 208 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing system 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The computing system 200 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the computing entity's 200 components may be located remotely from other computing system 200 components, such as in a distributed system. Furthermore, one or more of the components may be aggregated and additional components performing functions described herein may be included in the computing system 200. Thus, the computing system 200 can be adapted to accommodate a variety of needs and circumstances.

b. Exemplary User Computing Entity

Figure 3:
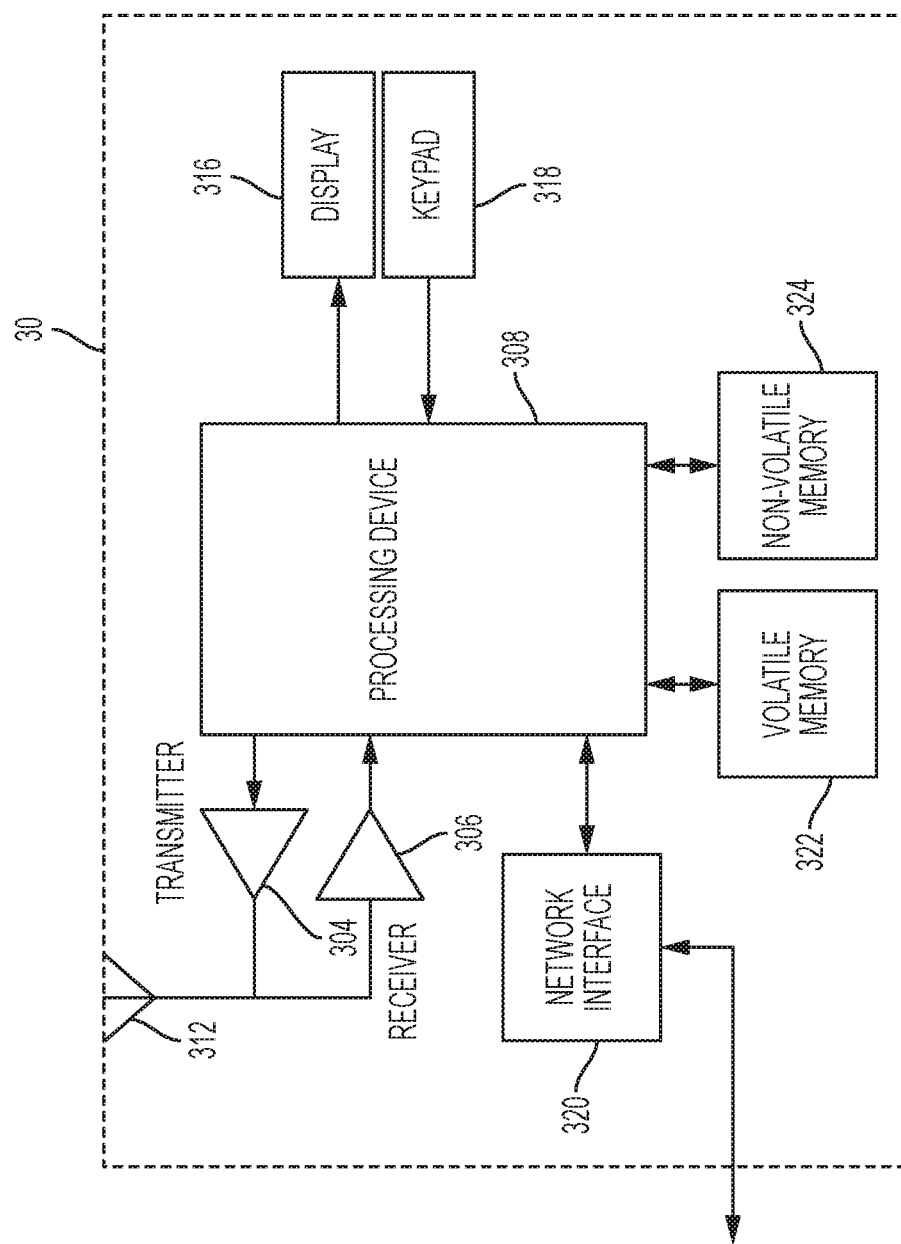
FIG. 3 is a schematic of a user computing entity in accordance with certain embodiments of the present invention.

FIG. 3 provides an illustrative schematic representative of user computing entity 30 that can be used in conjunction with embodiments of the present invention. As shown in FIG. 3, a user computing entity 30 can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various entities, such as a computing system 200, another user computing entity 30, and/or the like. In this regard, the user computing entity 30 may be capable of operating with one or more air interface standards, communication protocols, modulation types, and access types. More particularly, the user computing entity 30 may operate in accordance with any of a number of wireless communication standards and protocols. In a particular embodiment, the user computing entity 30 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 30 can communicate with various other entities using concepts such as Unstructured Supplementary Service information/data (USSD), Short Message Service (SMS), Multimedia Messaging Service (MIMS), Dual-Tone Multi-Frequency Signaling (DTMF), and/or Subscriber Identity Module Dialer (SIM dialer). The user computing entity 30 can also download changes, add-ons, and updates, for instance, to its firmware, software (e.g., including executable instructions, applications, program modules), and operating system.

According to one embodiment, the user computing entity 30 may include location determining aspects, devices, modules, functionalities, and/or similar words used herein interchangeably. For example, the user computing entity 30 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the computing entity's 200' position in connection with a variety of other systems, including cellular towers, Wi-Fi access points, and/or the like. Similarly, the user computing entity 30 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The user computing entity 30 may also comprise a user interface device comprising one or more user input/output interfaces (e.g., a display 316 and/or speaker/speaker driver coupled to a processing element 308 and a touch screen, keyboard, mouse, and/or microphone coupled to a processing element 308). For example, the user output interface may be configured to provide an application, browser, user interface, dashboard, webpage, and/or similar words used herein interchangeably executing on and/or accessible via the user computing entity 30 to cause display or audible presentation of information/data and for user interaction therewith via one or more user input interfaces. The user input interface can comprise any of a number of devices allowing the user computing entity 30 to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the user computing entity 30 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity 30 can collect information/data, user interaction/input, and/or the like.

The user computing entity 30 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the user computing entity 30.

c. Exemplary Networks

In one embodiment, any two or more of the illustrative components of the architecture of FIG. 1 may be configured to communicate with one another via respective communicative couplings to one or more networks 135. The networks 135 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 135 may have any suitable communication range associated therewith and may include, for example, global networks (e.g., the Internet), MANs, WANs, LANs, or PANs. In addition, the networks 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

V. Exemplary System Operation

The analysis and visualization features of the healthcare fraud risk system comprises at least two components: an analytic core and a user interface.

The analytic core first calculates/determines a set of risk factors for providers and members. The risk factors can be the product of any type of model, algorithm, or analytic, but in at least one implementation, the risk factors may be determined based on temporal interactions between separate providers and members as well as significant events such as medical visits, pharmacy prescriptions, dispensing of drugs, and deaths of a health insurance member. In certain embodiments, the healthcare fraud risk system is configured for generating and/or implementing other risk factors. Based on the risk factors, the analytic core then evaluates providers and members across single and multiple risk factors. Combinations of risk factors may be identified where particular combinations of risk factors elevate risk above what would be expected by the risk factors independently. A final set of providers of interest is determined by one or more scoring and/or ranking algorithms based at least in part on the risk factors and other attributes associated with the providers. The scoring and/or ranking algorithms may use machine learning capabilities such as via a C4.5, random forest, naïve Bayes, gradient boosting, deep-learning, and/or other algorithms. In that sense, the scoring and/or ranking algorithms can implement one or more machine-learning models. The one or more machine-learning models ultimately generate a score (e.g., an overall risk score) for each provider or member. In this manner, the analytic core provides a measure of risk associated with multiple suspicious events corresponding to a provider or member. Further, the analytic core generates a hierarchical ranking of providers based on their overall risk score and a set of providers of interest based on the ranking.

The healthcare fraud risk system then visually displays, via a provider leads view/panel/tab/portion, a visual representation of the providers of interest in the graphical interactive fraud risk user interface. The provider leads view/panel/tab/portion of the interactive fraud risk user interface displays information such as the overall risk score associated with each of the providers of interest, a risk category (such as low, medium or high), and other attributes of interest. In certain embodiments, the interactive fraud risk user interface is configured to accept user input selecting a provider from the list of providers of interest and to populate a provider swimlanes view/panel/tab/portion, based at least in part on the user input that provides an overview of the members associated with the selected provider. The swimlanes view/panel/tab/portion displays components relevant to a risk score—for example, interactions or life events of one or more members—in a timeline that correspond to the risk score. The swimlanes view/panel/tab/portion may also display information associated with each displayed member such as his or her corresponding risk factors. The interactive fraud risk user interface provides tools such as optionally usable filters and/or other functionalities (e.g., selectable via user input on a icon/button/graphic displayed via the user interface) that add useful functionalities such as adjusting the timeline in which member medical histories are displayed, displaying only providers or members that have been detected under a particular risk factor, and/or the like.

a. Analytic Core

The analytic core may be executed by the computing system 200 (See FIGS. 1 and 2A) and is generally described in that manner herein. In certain embodiments, the analytic core determines risk factors that are calculated for providers and members. Further, the analytic core determines an overall risk score for each of the providers and members and determines a hierarchical ranking for providers. To support its various methodologies, the analytic core accesses data stored in storage media 206 and 207. The analytic core may thus refer to one or more data stores in storage media 206 and 207. Additionally, the analytic core may write to a plurality of data stores in storage media 206 and 207 in order to support its own methods as well as to support the operations of the interactive fraud risk user interface.

In one embodiment, the analytic core uses healthcare data (e.g., claims data) and a plurality of risk factors which serve as inputs to one or more machine-learning models that can be used to output an overall risk score for each provider/member. The risk rules for the providers and members, as well as other properties of the providers and members such as servicing state, the NPI taxonomy of the provider (e.g., as described by groupings of NPI taxonomies in a hierarchy), facts about the claims volume, billed and paid amounts, and other attributes may be identified in the inputs to the machine learning model. In one embodiment, the output may be in a binary form, such as a Boolean variable taking one of two possible statuses ("true" and "false" or 1 and 0). In another embodiment, the output is a graded score, such as a value from 1-999. Similarly, the analytic core can rank the plurality of providers and/or members based at least in part on the overall risk score (e.g., in ascending or descending order).

A sampling of risk factors for providers and members that can be used to generate risk scores is provided below.

Excessive drug prescription/use/supply of known dangerous, addictive, or other subset of drugs, such as those indicated as Schedule II or expensive drugs.

Outlier drug prescribers at national level.

Providers billing members for services after member death.

Providers and members with other internal fraud flags, such as member risk, explicit fraud flags and SIU open-case providers.

Providers who are far away from their members (e.g., more than a threshold distance between provider treatment locations and known member residence locations), including drug abuse treatment center schemes.

Exclusive use of specialist pharmacies.

A person having ordinary skill would recognize that additional risk factors are also contemplated. The following list provides additional exemplary embodiments of risk factors that are calculated based on the data stored in the claims data 211 (e.g., facilities claims data and/or professional claims data). Each of these risk factors may be applied to data spanning one, two, three, or more years of data:

Providers who are paid more than $100,000 per month, have average claim payment amounts greater than $200 and who have risk scores greater than a configurable number.

Providers who are paid more than $5,000 per month for members with member risk scores greater than a configurable number.

Providers who are billing for members greater than 1,000 miles away and are paid more than $100,000 across their members.

Out-of-network substance abuse treatment centers who are billing for members who live more than 1,000 miles away and have Member Risk scores greater than a configurable number.

Similarly, the following list provides a few exemplary embodiments of the risk factors that are calculated based on claims data 211 encompassing prescription claims data. Each of these example risk factors may be applied to data spanning a selected timeframe, such as one or more years of data:

The top 100 prescribers of schedule II drugs (and/or other drugs satisfying a selected criteria), by claim count.

The top 100 prescribers of high cost prescription drugs, by claim count.

The top 100 prescribers of all drugs, by claim count.

Providers with more than 20 prescriptions per month and a provider score greater than a configurable number.

Providers prescribing to members who have more than 10 prescriptions and $1,000 in paid amounts for schedule II drugs per month.

Providers prescribing to members who have more than 10 prescriptions and $1,000 in paid amounts for high cost drugs per month.

To continue with exemplary risk factors, the following list provides additional example risk factors that can be implemented by the analytic core. Each of these risk factors may be applied to data spanning one, two, three, or more years of claims data:

Providers with claims for members in the Death Master File with dates-of-service more than 7 days after date-of-death and the total paid amount for claims is greater than $200 per claim.

Providers with claims for members in the Death Master File, with dates-of-service after the date-of-death.

Providers with claims for members in the Death Master File with dates-of-service in the previous 6 months.

Providers with claims for members in the Death Master File with dates-of-service in the previous 6 months and averages claim payments greater than $200 per claim.

Providers with claims for members in the Death Master File.

As will be recognized, a variety of other risk factors can be used within the scope of embodiments of the present invention. And as previously indicated, the plurality of described risk factors may serve as input to one or more machine learning models that evaluate the risk factors in relation to the claims data to output an overall risk score for each provider and the underlying risk factors. As will be recognized, a variety of machine learning models can be used to evaluate the data and generate a risk score, including deep-learning, gradient boosting, naïve Bayes, random forest, C4.5 tree, decision tree, logistic regression, regression, KNN, and/or the like.

Figure 9:
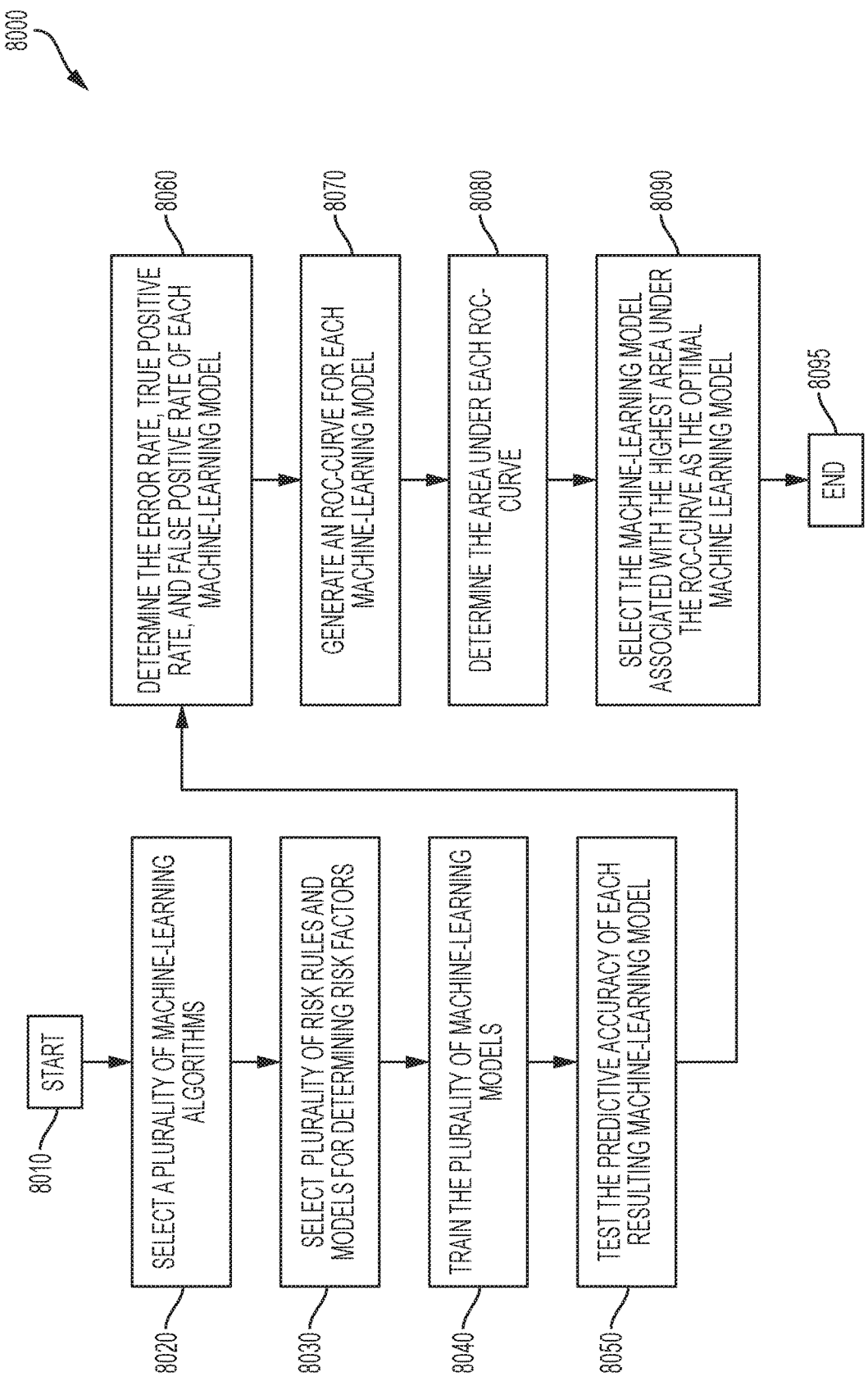
FIG. 9 is a flowchart for an exemplary method for implementing a machine-learning model in an analytic core.

In a particular embodiment, the overall system may benefit from using an optimal machine-learning model. FIG. 9 shows a flowchart of an example method 8000. Method 800 begins at step/operation 8010. At step/operation 8020, a plurality of machine-learning algorithms are selected for testing. At this stage, a variety of algorithms (deep-learning, gradient boosting, naïve Bayes, random forest, C4.5 tree, decision tree, logistic regression, regression, KNN) are selected for testing. The analytic core is thus configured to implement the logic necessary to implement models that can be trained by using each of the selected algorithms. In some embodiments, the analytic core is configured to implement such logic based on machine-readable instructions stored in memory media 206, where the instructions implement the methodologies associated with each machine-learning algorithm.

At step/operation 8030, the analytic core is configured to process claims data based on a plurality of risk factors, such as those discussed above. At step/operation 8040, memory media 206 is configured to store a training data set. The training data set comprises facility claims data, professional claims data, prescription claims data, member death data, flag and case data, and outlier provider list data. The data comprising the data training set is thus included in the corresponding tables of memory media 206. The training data set may include two data subsets, one data subset may include all data associated with a plurality of providers and members that have been previously determined to represent fraudulent activity whereas the other data subset may include those that represent non-fraudulent activity. In short, one subset represents samples of fraudulent activity and the other subset represents samples of non-fraudulent activity.

To provide further context, in one embodiment, the training data set may include all data associated with 50,000 providers that have been determined to be "fraudulent." Further, the training data set may include all data associated with 50,000 providers that have been determined to be "not fraudulent." Such a large number of samples allows for improved accuracy outputs from the resulting machine-learning models.

After populating memory media 206 with the training data set, which may include a designation of "fraudulent" or "non-fraudulent" for each provider and member. The analytic core then processes the training data set with the plurality of risk factors and algorithms with which it was configured at step/operation 8030. In other words, the analytic core trains each of the machine-learning models based on the algorithms implemented at step/operation 8020. In training, the machine-learning model finds patterns that map the plurality of risk factors, which are the input to the machine-learning model, to a target, which is a designation of fraudulent or non-fraudulent for each member or provider. The analytic core repeats this training process for each of the machine-learning models until all of the machine-learning models have had an opportunity to process the training data set.

In some embodiments, by the end of 8030, the analytic core is configured to store to the plurality of trained machine-learning models implementing the patterns developed as a result of processing the training data set. The analytic core may store the trained machine-learning models in memory media 206 as a set of machine-readable instructions. Thus, the analytic core may then refer to each of the stored machine-learning models to process a new input data set obtain predictions of whether the new input data set represents a fraudulent or non-fraudulent provider or member and a confidence score associated with such prediction. As a person with ordinary sill in the art would recognize, each of the trained machine-learning models may provide different outputs on the same data because each of the trained machine-learning models is based on one or more different algorithms. Thus, the accuracy of the machine-learning models may also differ.

Because the outputs may differ, at step/operation 8050, the analytic core tests the predictive accuracy of each trained machine-learning model using a test data set. The test data set is also stored media memory 206, and the analytic core retrieves the claims data associated with the test data set. The analytic core then processes the test data set based on the trained machine-learning models. A distinguishing feature between the training step (8040) and the testing step (8050) is that, at step/operation 8040, the trained machine-learning models are not provided with a designation, of fraudulent or non-fraudulent, for each of the providers and members represented in the testing set. Thus, the trained machine-learning models are employed to provide a predictive output regarding each provider and/or member included in the test data set. The analytic core stores in memory media 206 the predicted outputs of each trained machine-learning algorithm. Thus, the memory media 206 stores a table that associates, for each trained machine-learning model, each provider and member (via their identifiers) that was included in the test data set with a corresponding designation of fraudulent or non-fraudulent (e.g., the prediction from the trained machine-learning algorithm). The output of each trained machine learning model may thus be compared to the previously known designation of fraudulent or non-fraudulent for each provider and member included in the test data set. This is further discussed with regards to step 8060.

At step/operation 8060, the analytic core compares the predicted outputs from each trained machine learning algorithm to the previously known designation for each member or provider. In other words, at step/operation 8050, each trained machine learning algorithm provides, for each provider and/or member in the test data set, an output prediction that classified the member and/or provider behavior that led to a particular submission of claims as either fraudulent or non-fraudulent. Additionally, the test data set may include a known designation of either fraudulent or non-fraudulent for each member and provider included in the test data set. Thus, at step/operation 8060, the analytic core may compare the predicted outputs with the known designations. There may be four possible outcomes regarding the predictive accuracy of each trained machine-learning model per provider. For a given provider, if the trained machine-learning model predicted that the provider is fraudulent, and the known designation for the provider is fraudulent, this is called a true positive result; however, if the known designation for the provider is non-fraudulent, this is called a false positive result. Conversely, a true negative result occurs when both the output prediction and the known designation for a given provider are a classification of non-fraudulent; and the false negative result is when the output prediction is of non-fraudulent while the known classification is of fraudulent.

Figure 15:
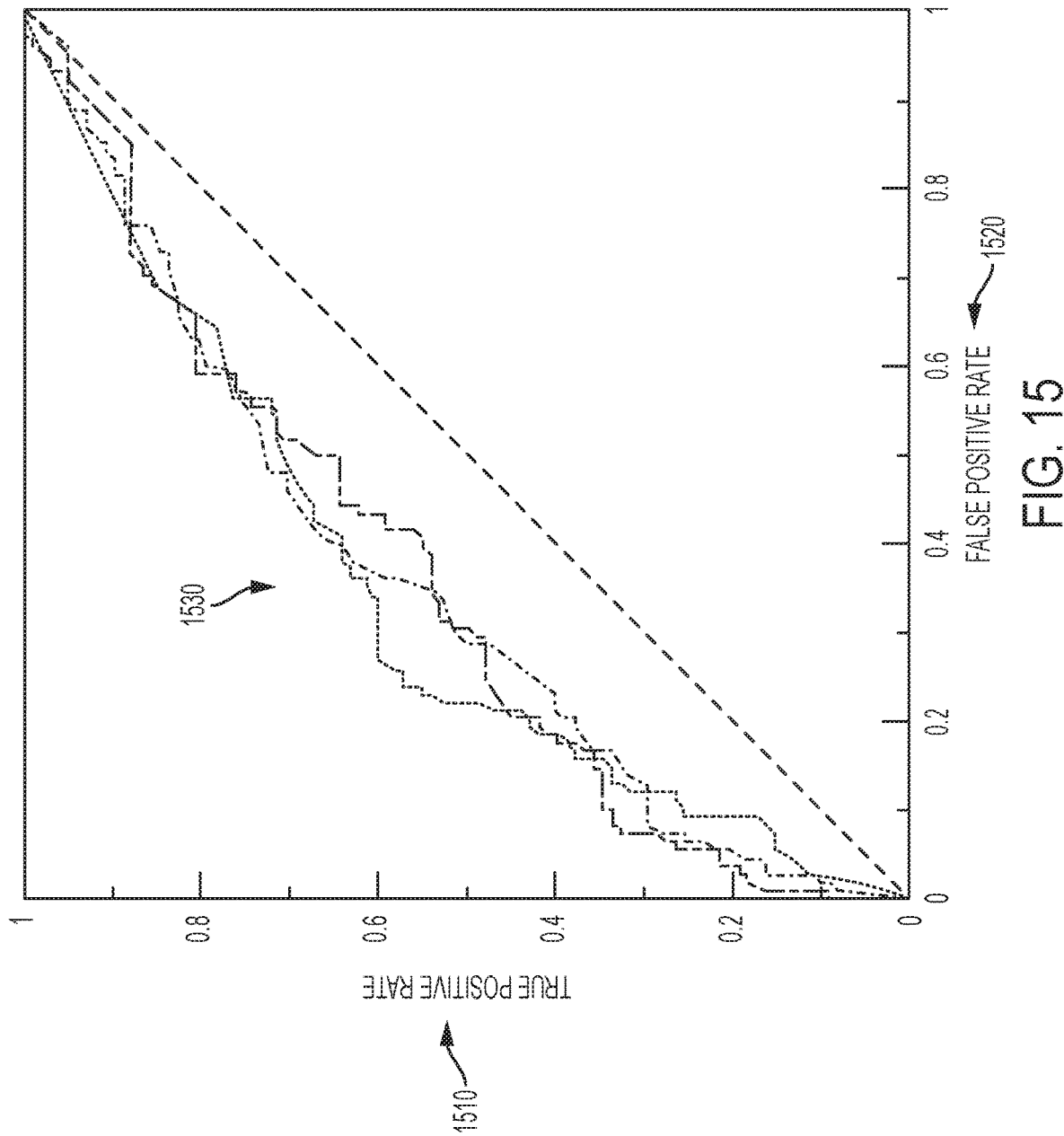
FIG. 15 is an exemplary embodiment of an ROC curve.

Thus, at step/operation 8060, the analytic core determines an error rate, a true positive rate (sensitivity), true negative rate (specificity), and a false positive/negative rate for each of the trained machine-learning models. At step/operation 8070, the analytic core determines, based at least in part on the previously determined parameters such as the true positive rates and the false positive rates, an ROC curve (Receiver Operating Characteristic curve) for each machine-learning model. The ROC curve is a graphical plot that illustrates the predictive abilities of a binary classifier system, such as the trained machine-learning models, by plotting the true positive rate against the false positive rate. For example, FIG. 15 shows an exemplary embodiment of an ROC curve 1530 for three different binary classifier systems: the ROC curve 1530 is created by plotting the true positive rate (indicated along axis 1510) against the false positive rate (indicated along axis 1520) at various threshold settings. The properties of the false and true classification rates, and the AUC (area under the curve) of the ROC curve is utilized in order to select the model with the best prediction of the target class. The ROC curve plotting and AUC calculation is done with standard statistical packages that iterate through the data to plot the ROC curve and calculate the AUC. To generate the ROC curve, the analytic core repeats any of steps 8030-8060 as necessary.

At step/operation 8080, the analytic core determines the area under the ROC curve corresponding to each of the machine-learning models. In one embodiment, the analytic core calculates the integral of the ROC curve from a false positive rate of 0 to 1.

At step/operation 8090, the analytic core determines which of the trained machine-learning models has the largest area under the curve, and selects that trained machine-learning model as the optimal machine-learning model for use in scoring providers. This is the optimal machine-learning model because the area under the ROC curve is equal to the probability that the machine-learning model will rank a randomly chosen fraudulent instance higher than a randomly chosen non-fraudulent one (assuming that "fraudulent" ranks higher than "non-fraudulent"). Thus, the predictive accuracy of the optimal machine-learning model is higher than the other tested machine-learning models. As indicated at step/operation 8095, the method 8000 ends.

Figure 10:
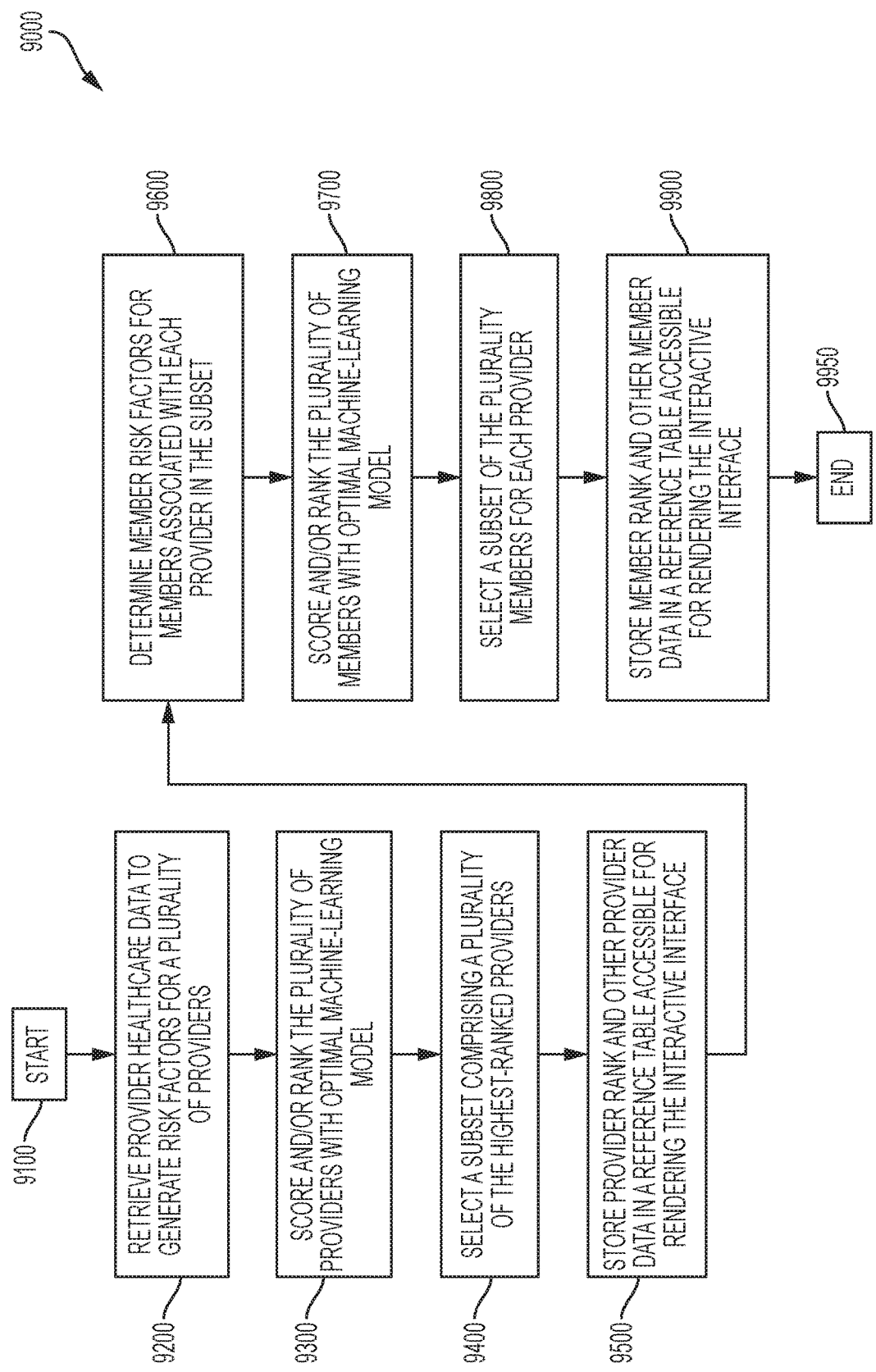
FIG. 10 is a flowchart for an exemplary method for ranking and selecting providers and members for display in an interactive fraud risk user interface.

With the optimal machine-learning model selected, FIG. 10 shows a method 9000 for ranking and selecting providers and members for display in an interactive fraud risk user interface. This method begins at step/operation 9100. At step/operation 9200, the analytic core retrieves the claims data stored in memory media 206 for analysis. The analytic core processes the claims data by applying the logic specified by the methodologies of a plurality of risk factors and models. The analytic core does this for all providers corresponding to the claims data 211. The previous discussions regarding the risk factors and models is applicable to step 9200. Thus, as a result of applying the logic implemented by each of the risk factors and models, the analytic core generates and stores, in memory media 206, a plurality of risk factor output tables associated with the risk factors and further associated with either provider identifiers or member. The previously discussed embodiments of a risk factor output table are applicable here, and thus, each of the risk factor tables may take the form of Table 1, below. Data within the risk factor output table may be combined with a data store of medical and/or pharmaceutical claims data to constitute the claims details to return to the interface.

TABLE 1

| Field | Type | Description |
| --- | --- | --- |
| SCENARIO | Integer | Unique integer ID |
| SCENARIO_DESC | Charvar(100) | Text description of Risk Factor |
| PROVIDER_IDENTIFIER_TYPE | Integer | Integer provider ID type |
| PROVIDER_IDENTIFIER | Charvar(12) | Provider ID |
| MBR_ID | Charvar(35) | Member ID |
| DEATH_DATE | Date | Date of death, if known |
| IS_RX | Integer | 1 if record from pharmaceutical data, 0 otherwise |
| RX_MBR_ID | Charvar(20) | MBR_ID found on pharmaceutical claims, if known |
| IS_OFFSHORE_RESTRICTED | Integer | 1 if restricted from offshore personnel, 0 otherwise |

TABLE 1-continued

| Field | Type | Description |
| --- | --- | --- |
| START_DATE | Date | Start of period, for Risk Factors that have a time component |
| END_DATE | Date | End of period, for Risk Factors that have a time component |
| LOAD_DT | Date | Date Risk Factor data was loaded to table |

As will be recognized, risk factors can either be provider-based (professional, facility or pharmacy) or member-based. In the case of provider-based risk factors, a set of N providers is first selected. Then, for each provider, a set of M members is selected based upon the member's total paid amount. For a given provider in a given risk factor, there will be a row in the swimlanes table for each of the M members. In the case of member-based risk factors, a set of M members is first selected. Then, for each member, a set of N providers is selected based upon the provider's total paid amount. For a given member in a given risk factor, there will be a row in the swimlanes table for each of the N providers.

At step/operation 9300, the analytic core analyzes, based on an optimal machine-learning model, at least a portion of the entire set of risk factor output tables generated at step 9200. The analytic core analyzes the risk factor output tables by applying an optimal machine learning model such as an optimal machine-learning model generated via method 8000. Based on the entire set of risk factor output tables, the analytic core thus predicts whether each provider included in the claims data is performing fraudulent or non-fraudulent activities and generates a score for each provider and ranks the providers based at least in part on the generated scores. Additionally, for those providers that the analytic core classified as fraudulent, the analytic core generates an overall risk score that is based on the entire set of risk factor output tables and ranks the providers according to their respective overall risk score.

Figure 14A:
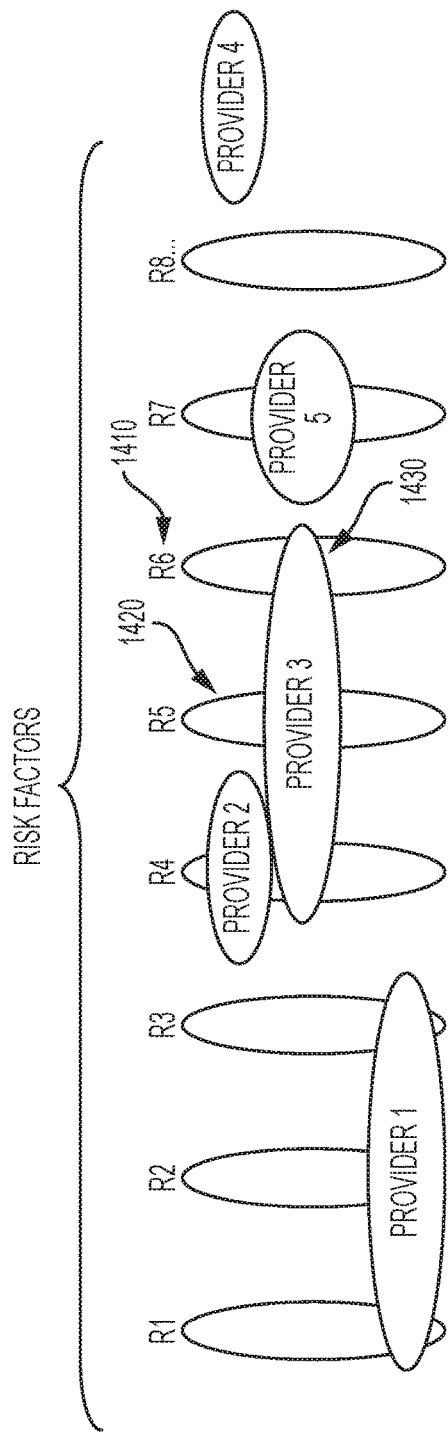
FIGS. 14A-14B are illustrations embodying the ranking of providers and members.

For example, FIG. 14A shows an illustration of an embodiment of step 9300. In this embodiment, the claims data may include information associated with five providers such as provider 1430 (e.g., Providers 1-5). For this embodiment, the analytic core identified nine risk factors such as risk factor 1410 (e.g., Risk Factors R1-R8 and R9 which is not shown) at step 9200. Thus, as shown in FIG. 14A, Provider 1 meets the criteria for Risk Factors R1-R3, Provider 2 meets the criteria for Risk Factor R4, Provider 3 meets the criteria for Risk Factors R4-R6, Provider 5 meets the criteria for Risk Factor R7, and Provider 4 meets the criteria for Risk Factor R9 (not shown in FIG. 14A). Accordingly, in this embodiment, memory media 206 would include risk factor output tables associating Provider 1 to Risk Factors R1-3, Provider 2 to Risk Factor R4 and so on.

Continuing with the embodiment of FIG. 14A, the analytic core, after generating the risk factor output tables, then employs the optimal machine-learning model to generate overall risk scores for each of the Providers 1-5. Similarly, the analytic core also generates a ranking of the Providers based on the overall risk scores. For example, as shown in FIG. 14A, Provider 3 ranks the highest because it is associated with Risk Factors R4-R6 whereas Provider 1 is ranked second-highest because it is associated with Risk Factors R1-R3. Even though both providers are associated with the same number of risk factors (namely, both providers are associated with three risk factors), the machine-learning model has determined, based on its advanced fraud recognition patterns (developed as a result of a method like 8000), that a combination of factors such as R4-R6 has a higher likelihood of representing fraud than a combination of factors such as R1-R3.

At step/operation 9400, the analytic core selects a subset of the providers (known as risky providers) included in the claims data based on their rank or overall risk score. For example, at step/operation 9400, the analytic core selects the 350 providers with the highest overall risk scores. However, a person having ordinary skill in the art would recognize that the number of selected providers may vary and may be selected to match the capabilities of the system. For example, in some embodiments, the number of desired providers may be severely reduced if the capacity of the system is expected to be limited. One such example would be where a user computing entity 30 may have limited memory capacity to temporarily store the provider information that is to be displayed. This discussion assumes that a memory storage unit in user computing entity 30 needs to at least temporarily hold the provider data for display. However, nothing in this discussion should be construed as limiting the invention to this example, which is merely provided for illustrative purposes.

At step/operation 9500, the analytic core stores in memory media 206 relevant information regarding the subset of providers that it selected at step/operation 9400. The stored information may include, for example, the provider identifier, the provider rank, the overall risk score, and other relevant parameters. The data is stored in a table that is accessible for rendering the information on a display via an interactive fraud risk user interface. In one embodiment, the analytic core, for each of the providers in the subset of providers, generates and stores a table such as the swimlanes provider table reproduced at Table 2 below:

TABLE 2

| Table | Type | Description |
|---|---|---|
| PROVIDER_IDENTIFIER_TYPE | Bigint | Integer provider ID type |
| PROVIDER_IDENTIFIER | Charvar(12) | Provider ID |
| PROV_SVC_NAME | Charvar(90) | Service name of provider |
| PROV_BIL_NAME | Charvar(70) | Billing name of provider |
| PPR_FILTER | Charvar(150) | Provider Type |
| PPR_TAXONOMY_ID | Bigint | Provider Type lookup ID |
| SVC_ST | Charvar(7) | Service state |
| AMT_BIL | Double | Total amount billed |
| AMT_PD | Double | Total amount paid |
| CLM_CNT | Double | Total claim count |
| MBR_CNT | Double | Total member count |
| SCENARIO_CT | Numeric(21,0) | Total number of Risk Factors in which this provider ID is found |
| OVRL_RISK_SCORE | Double | Output of provider ranking algorithm |
| CREATE_DT | Date | Date table was created |

In certain embodiments, the swimlanes provider table (such as that shown in Table 2) constitutes a driver table that may be combined with a data store of medical and/or pharmaceutical claims data to constitute the claims details to return to the interface.

At step/operation 9600, the analytic core determines overall risk factors for each member associated with each provider in the subset. To determine the overall risk factors for each member associated with each provider in the subset, the analytic core uses an optimal machine-learning algorithm such as one produced by method 8000. This step is similar to step 9200 except that the claims data is now processed for all members associated with the providers in the subset of providers. Further, the risk factors and models that the analytic core applies are those designed to determine risk factors associated with members as opposed to providers. However, in the end, the analytic core, like in step 9200, outputs a risk factor output table having data such as is shown in Table 3, below:

TABLE 3

| Field | Type | Description |
|---|---|---|
| SCENARIO | Integer | Unique integer ID |
| SCENARIO_DESC | Charvar(100) | Text description of Risk Factor |
| PROVIDER_IDENTIFIER_TYPE | Integer | Integer provider ID type |
| PROVIDER_IDENTIFIER | Charvar(12) | Provider ID |
| MBR_ID | Charvar(35) | Member ID |
| DEATH_DATE | Date | Date of death, if known |
| IS_RX | Integer | 1 if record from pharmaceutical data, 0 otherwise |
| RX_MBR_ID | Charvar(20) | MBR_ID found on pharmaceutical claims, if known |
| IS_OFFSHORE_RESTRICTED | Integer | 1 if restricted from offshore personnel, 0 otherwise |
| START_DATE | Date | Start of period, for Risk Factors that have a time component |
| END_DATE | Date | End of period, for Risk Factors that have a time component |
| LOAD_DT | Date | Date Risk Factor data was loaded to table |

Figure 14B:
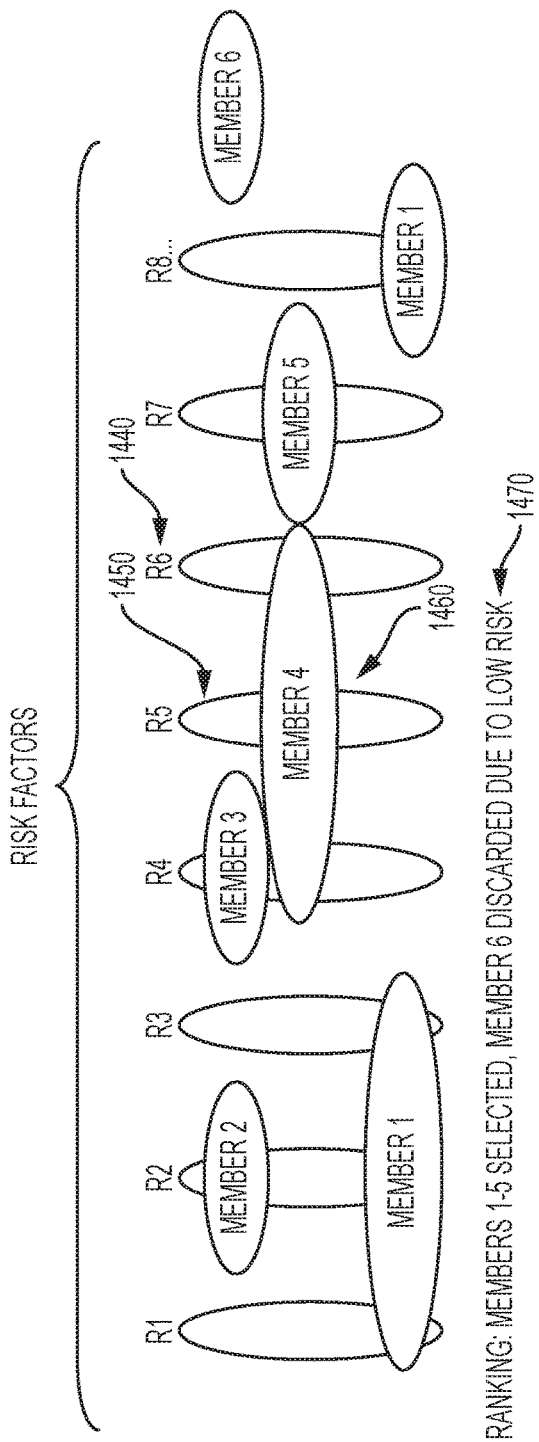

At step/operation 9700, the analytic core scores and/or ranks, for each of the providers in the subset of providers, the plurality of members. To that end, the analytic core generates an overall risk score for each of the members and ranks them accordingly. This step is similar to 9300 except that instead of ranking providers, the analytic core ranks members. FIG. 14B illustrates the ranking of members, which is analogous to FIG. 14A and may include risk factors 1440 presented in reference to various members 1460.

At optional step 9800, the analytic core selects a subset of the plurality of members for each provider. For example, as FIG. 14B shows, the analytic core may discard those members who do not have an overall risk score that satisfies a threshold (e.g., exceeds a minimum threshold). FIG. 14B shows this via ranking 1470, which specifies that Member 6 was discarded due to low risk. The resulting members may be classified as risky members based on their identification as having a risk score above a defined threshold.

At step/operation 9900 the analytic core stores the member ranks and other member data in a reference table that is accessible for rendering the interactive fraud risk user interface. This is similar to step 9500 except the stored tables relate to the members in each of the providers in the subset of providers. Further, the table stores data regarding the claims that contributed to the risk factors and the overall risk scores. This data is necessary for the interactive fraud risk user interface as will become apparent in the discussion addressing its functionalities. The method 9000 ends at block 9950.

b. Interactive User Interface

In one embodiment, the interactive fraud risk user interface comprises two main views: the provider leads view/panel/tab/portion and the provider swimlanes view/panel/tab/portion. Both appear as tabs that form part of an interactive fraud risk user interface, and a user can move from one to another accessing different aspects of the linked data. In a particular embodiment, the interactive fraud risk user interface is built using reactive programming. FIGS. 4-7 show examples of such interfaces that are presented or rendered by one or more displays of one or more user computing devices 30.

Figure 11:
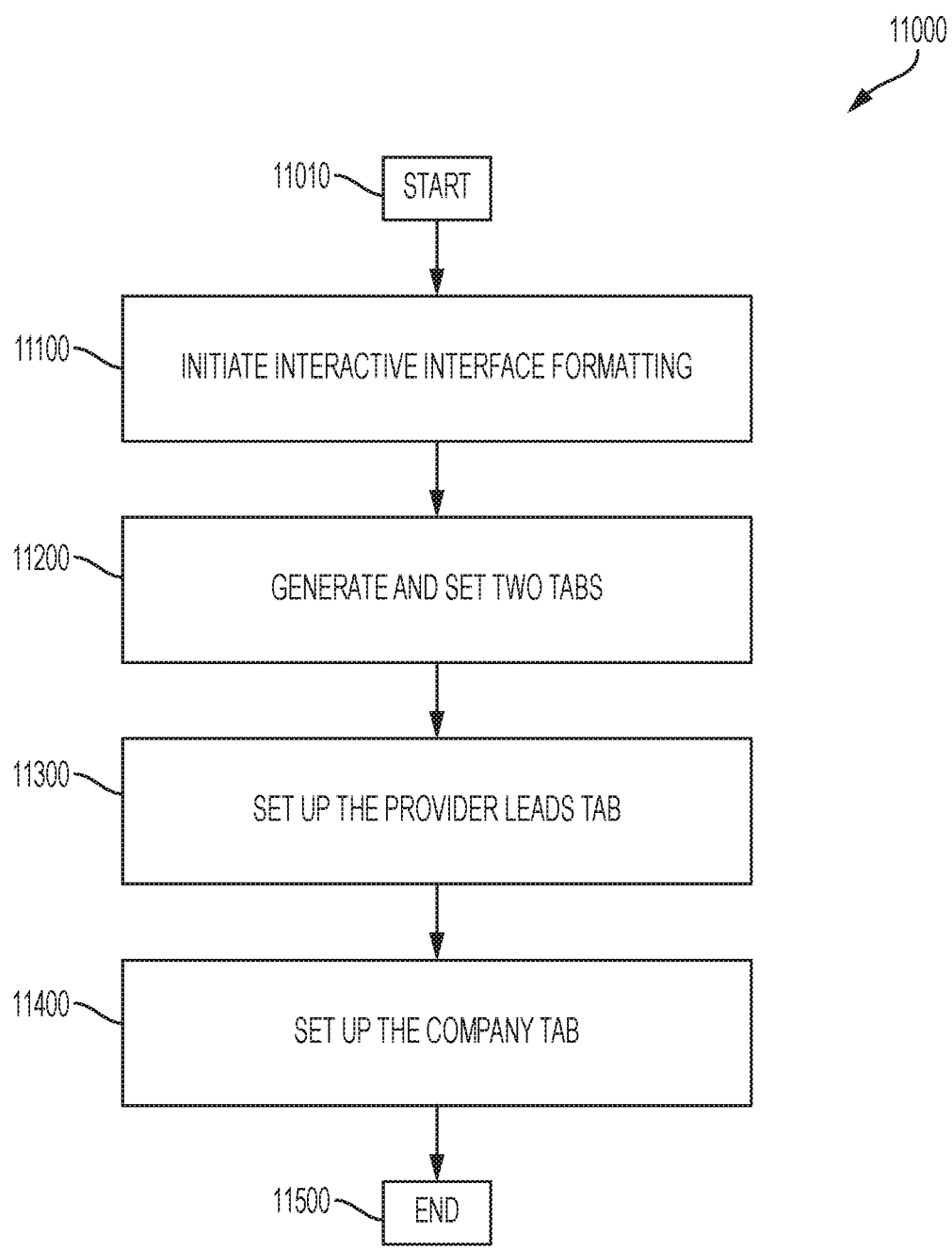
FIG. 11 is a flowchart for an exemplary method for setting up a user interface.

FIG. 11 shows a method 11000 for setting up the user interface beginning at step/operation 11010. Even though this discussion contemplates that the display functions are executed in a user computing entity 30, the functions could be distributed differently as discussed herein. At step/operation 11100, a processing element 308 of a user computing entity 30 generates and outputs an interactive fraud risk user interface. The formatting of the interface may comprise the sizing of the window, the font used, the location of various elements and the like. Further, the formatting may include generating a control panel, which may comprise elements 4051, 5051, 6051, and 7051 of FIGS. 4-7. The formatting of the control panel may identify the configuration of graphical elements depicting the risk factors, the type of provider, the association of risk factors with providers and members, the timeframe of the claim events depicted, and/or any explanatory or supplemental data that is configured to appear in pop-up boxes or frames when the user interacts with icons or controls on the interface. At step/operation 11200, a computing entity 30/200 generates two tabs visible in the window generated at step/operation 11100. At steps/operations 11300 and 11400, a computing entity 30/200 sets the formatting of the two tabs and populates the two tabs, comprising the provider leads view/panel/tab/portion and the provider swimlanes view, with elements such as the filter boxes 4040, 4010, 4060, 4050, 4020, the timeline zoom actuators such as 6080 and 7080, and so on. In certain embodiments, neither the provider leads view/panel/tab/portion nor the provider swimlanes view/panel/tab/portion is populated with provider or member data at this stage. The method ends as indicated at step/operation 11500.

In one embodiment, for steps/operations 11100-11400, a computing entity 30/200 generates and stores an object that may include or has access to instructions in the form of computer code that may be used by the fraud detection system to render the interactive fraud risk user interface on a display. Thus, the object would include those instructions for embodying steps/operations 11100-11400. For example, the interface object may include information such as the font of the interactive fraud risk user interface, the size of the window, and so on.

Figure 12:
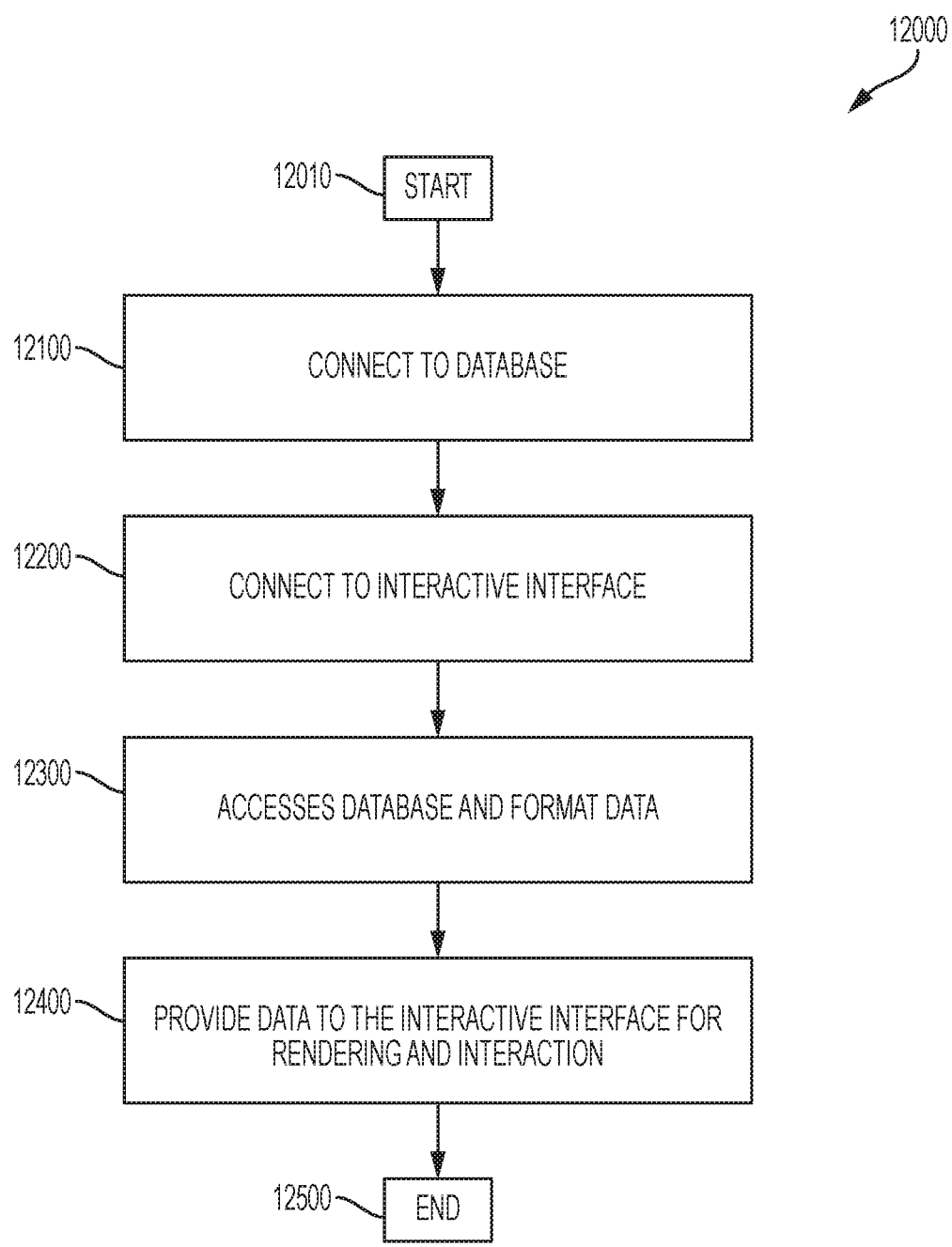
FIG. 12 is a flowchart for an exemplary method for sending data to an interactive user interface for displaying provider and member information.

FIG. 12 shows a method 12000 for sending data to the interactive user interface for displaying provider and member information that begins at step/operation 12010. At step/operation 12100, processing element 308 connects to memory device 206. At step/operation 12200, the processing device connects to the interface object that may include the instructions in the form of computer code that may be used to render the interactive fraud risk user interface.

At step/operation 12300, a computing entity 30/200 retrieves provider and member data stored in a plurality of tables, such as those tables discussed in relation to steps 9500 and 9900 of method 9000. In some embodiments, a computing entity 30/200 may format the data into a usable form for the interface object.

At step/operation 12400, a computing entity 30/200 sends, writes or otherwise makes accessible the retrieved provider and member data to the interface object as needed. Thus, after step/operation 12400, the interface object has access and may include the data necessary to populate the provider leads view/panel/tab/portion and the provider swimlanes view/panel/tab/portion and the method ends at step/operation 12500. In certain embodiments, data may be provided to the interface upon the occurrence of a trigger event. For example, data may be provided from the database to the interface upon receipt of user input accessing an interface tab. As yet another example, upon receipt of user input providing a provider identifier via one or more fields accessible via the swimlanes view may cause the interface to update with a new set of data. As yet another example, upon receipt of user input at the alert list user interface view, the interface may receive data and/or request a new delivery of data to the interface (e.g., in accordance with user interface identifying one or more data filter options as provided via the user interface, such as the total number of providers returned, the risk factors of interest, and/or other parameters).

Figure 13:
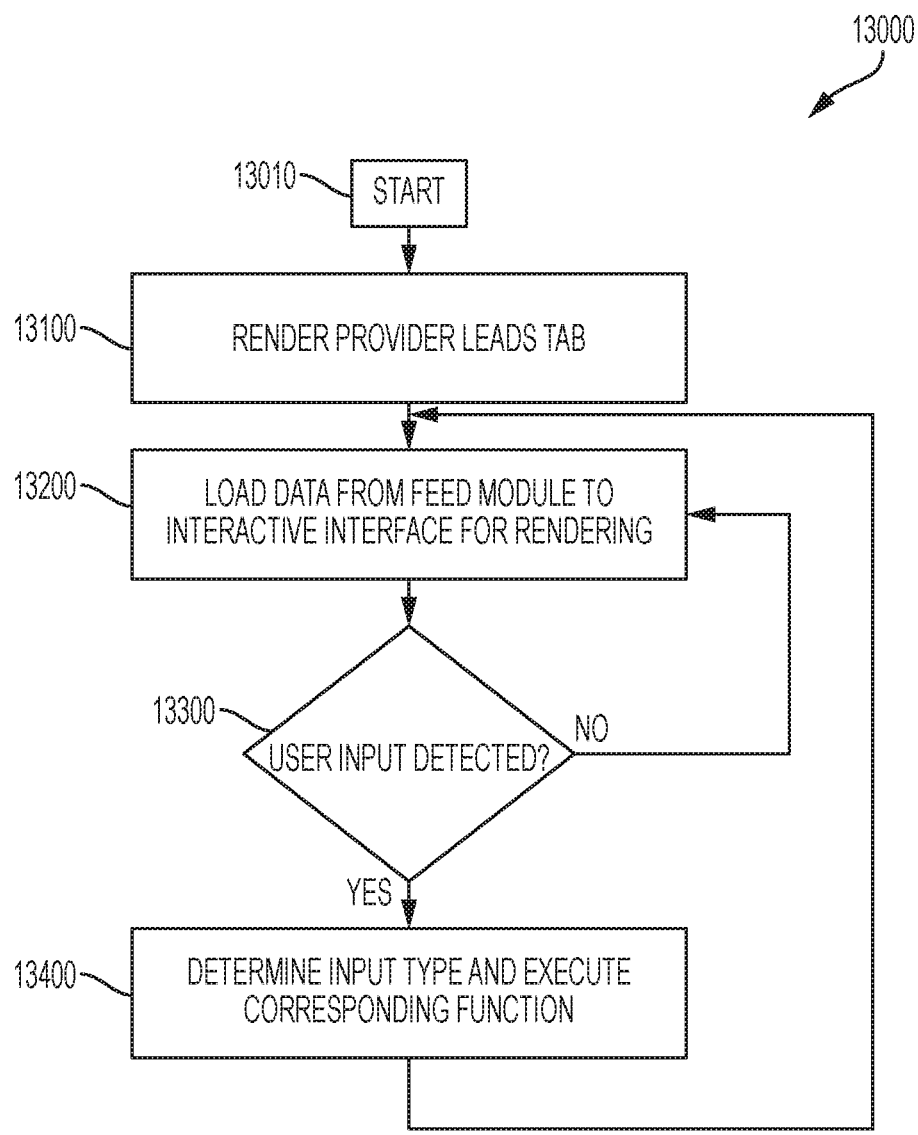
FIG. 13 is a flowchart for an exemplary method for displaying an interactive fraud risk user interface utilizing reactive programming.

FIG. 13 shows a method 13000 for displaying the interactive fraud risk user interface utilizing reactive programming. The method starts at step/operation 13010. At step/operation 13100, processing element 308 sends display data from the object interface to display 316 for rendering; the data corresponds to the provider leads tab. The display data may include the data associated with the provider leads tab as discussed in relation to steps/operations 11300 and 12400. As previously discussed, the data is stored in or otherwise accessible to the interface object. Further, the data may include information regarding the providers to be displayed such as the provider identifiers, provider ranks, overall risk scores, etc.

In certain embodiments, portions of the data provided to the interactive interface may not be displayed. If one or more filters are active, for example, data provided to the interactive interface but not satisfying the one or more filters may be omitted from the display. Such data may be stored in a cache associated with the interactive interface to enable quick-reloading of the data into the display if the filters are later removed.

At step/operation 13200, a computing entity 30/200 sends, writes or otherwise makes accessible any newly retrieved provider and member data to the interface object as needed. This step may be similar to step/operation 12400, in that the provider and member data is first retrieved from the plurality of tables stored in a database. Further, a computing entity 30/200 may format the retrieved data before sending it, writing it, or otherwise making it accessible to the interface object. Any changes occurring in the databases, such as when the analytic core processes new claims data and updates the tables and repositories in memory media 206, are propagated to the rendered interactive fraud risk user interface.

As part of step/operation 13200, after any newly retrieved provider and member data is sent to the interface object, processing element 308 sends the proper display data from the object interface to display 316 for rendering. For example, if the provider swimlanes tab is selected by user input via the interactive fraud risk user interface, then processing element 308 would send the display data corresponding to the provider swimlanes tab to display 316 for rendering.

At step/operation 13300, processing element 308 determines whether a user input has been detected. In one embodiment, the user input generates input data that is held in an input queue that is accessible to processing element 308. Thus, at step/operation 13300, processing element 308 retrieves the input data corresponding to the user input that has been in the queue for the longest time. A person having ordinary skill in the art would recognize that other methods of managing the queue exist such as a coalescing interrupt method, a first-in-first-out method, a method based on priorities where certain inputs are processed before others, and/or the like.

Returning to step/operation 13300, if processing element 308 determines that no input has been detected, the method continues with reference again to steps/operations 13200-13300, where the rendered interactive user interface may be updated with new display data (if necessary) and/or continues monitoring for user input.

On the other hand, if a computing entity 30 detects a user input at step/operation 13300, then a computing entity 30 determines the input type and then executes the function corresponding to the input type, as indicated at step/operation 13400. The various input types and functions will become readily apparent based on the discussion of the functionalities associated with the provider leads view/panel/tab/portion and the provider swimlanes view/panel/tab/portion provided below.

1. Provider Leads View

The first tab, provider leads view, is configured to generate a display providing a listing of a plurality of providers that have been deemed risky by the analytic core. The user interface is configured to selectably filter the list of providers presented. In certain embodiments, the display associated with the first tab is initially loaded/populated with data provided at least in part from the analytic core that is indicative of a set of providers with the highest risk score (e.g., the providers having the highest risk ranking). The display may be limited to a defined number of providers in order to minimize input latency. In certain embodiments, the number of providers indicated within the display may be manipulated based on user input (e.g., to increase and/or decrease the number of providers displayed) via an entry field included in the display. Additionally, the interface is configured to accept user input selecting one or more risk factors to generate user-specified groupings of risk factors for use during an analysis. Based on the user-specified groupings of risk factors, the interface repopulates the listing and ranking of providers for display based at least in part on the highest risk within this subset of risk factors. Accordingly, the interface is configured for user-specified targeting of provider behaviors of interest, while still applying a multivariate data driven decision support framework to the selection and/or display of the providers of greatest interest. The interface is further configured for joint risk of univariate factors to be provided via the system, which may incorporate advanced modeling techniques to prioritize provider leads. Moreover, the interface may be further configured to filter data results via user-selectable filter elements which may be displayed at the top of respective data columns. Such filtration options may enable additional criteria overlay and/or targeting of particular focus areas, such as, for example, a provider type or geographic location.

Figure 4:
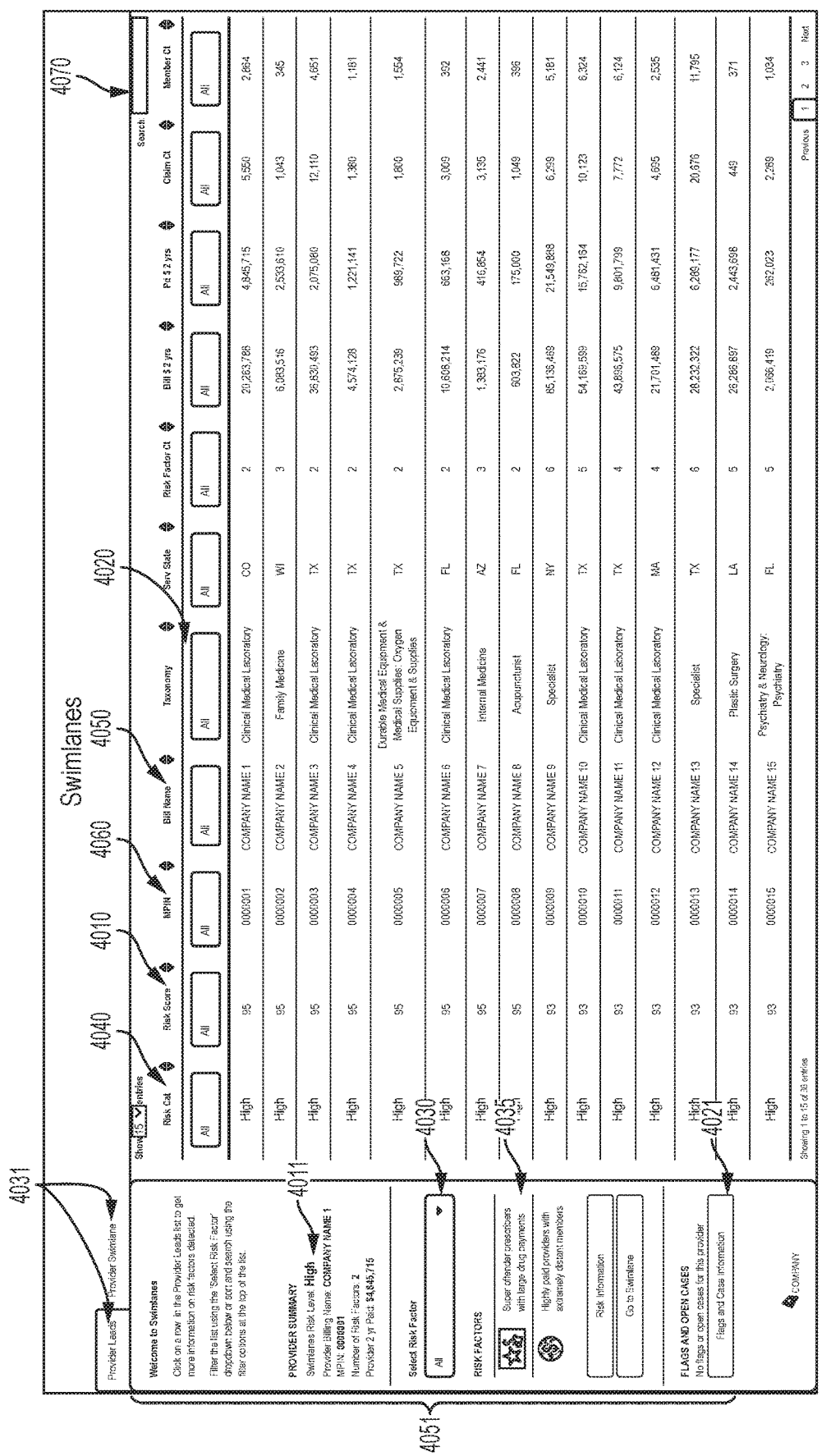
FIGS. 4-5 are exemplary embodiments of an interactive fraud risk user interface comprising a provider leads view.
Figure 5:
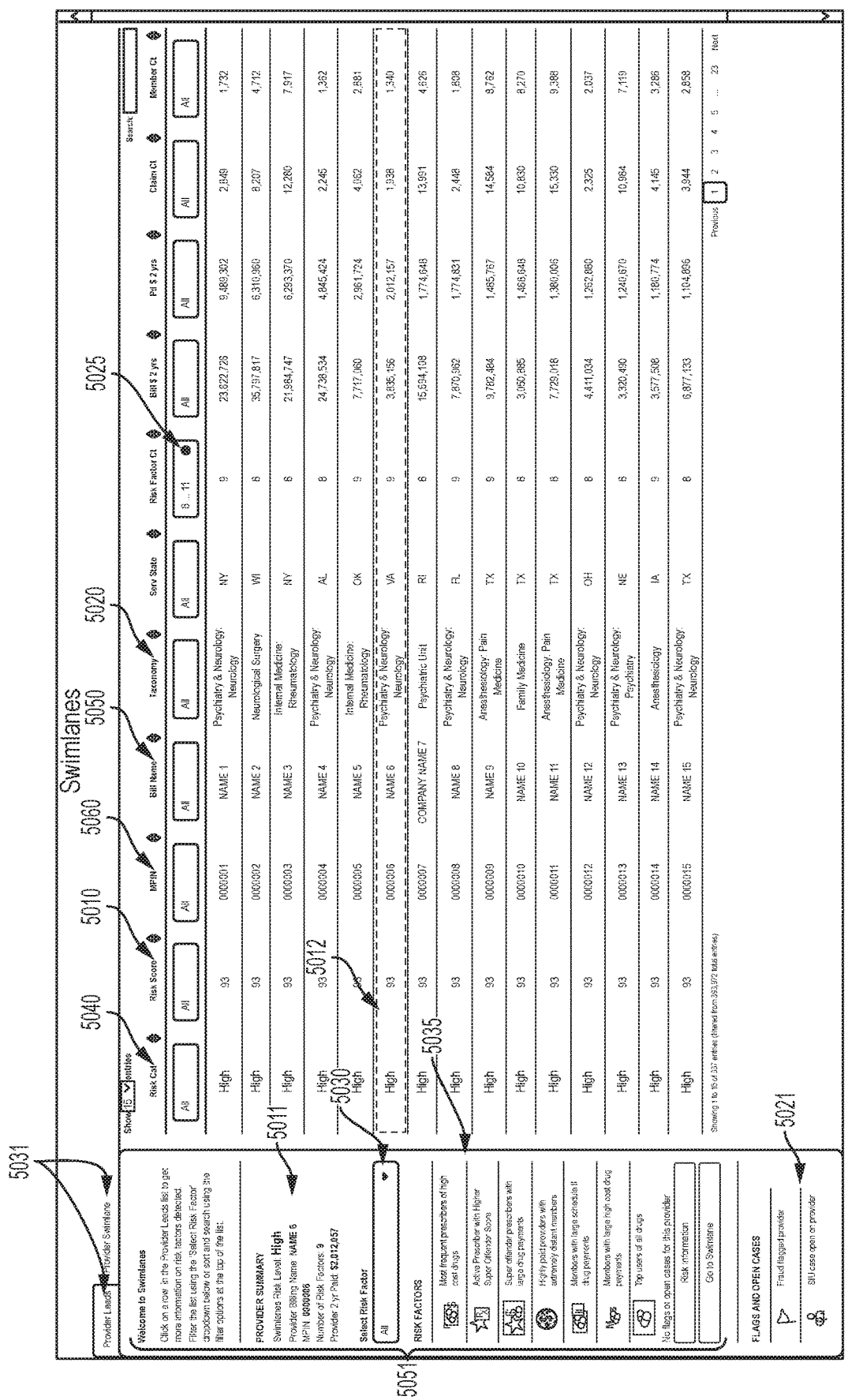

FIGS. 4-5 show exemplary embodiments of the provider leads view. FIGS. 4-5 show a control panel, 4051/5051, which may include a summary for a user-selected provider (or the first-listed provider if no provider has been selected by a user). For example, with reference to FIG. 5, shading 5012 illustrates a provider that has been selected (e.g., by a user inputs provided via a mouse, a keyboard, or a touch-screen). Accordingly, the control panel, in area 4011/5011, displays a summary corresponding to the selected provider. The summary comprises information such as the risk level represented by the provider's overall risk score, the name of the provider, the provider identifier, a risk factor count, and the amount the provider has been paid (by the health insurance payer) over a two-year period.

The control panel also provides a drop-down menu such as 4030 and 5030, for selection of risk factors. Activating item 4030 causes the interactive fraud risk user interface to display, via a drop down menu, a list of risk factors that can be used for filtering the displayed providers. For example, FIG. 4 shows a display where a user has selected to filter providers based on two risk factors: "Risky prescribers with large drug payments," and "Highly paid providers with extremely distant members," which are shown in area 4035 of the control panel. Thus, every provider listed in the provider leads view/panel/tab/portion of FIG. 4 is a provider associated with risk factor output tables that were generated as a result testing for the selected risk factors. Similarly, FIG. 5 shows an interactive fraud risk user interface where a user has selected to filter providers based on seven risk factors, which are listed in area 5035 of the control panel. Thus, every user displayed in FIG. 5 is associated with all five of those selected risk factors. The embodiments shown in FIGS. 4 and 5 do not display providers that are not associated with the selected risk factors.

In the provider leads view, interactive user interface is configured to filter providers upon receipt of user input activating the boxes underneath items 4040/5040, 4010/5010, 4060/5060, 4050/5050, 4020/5020. For example, with reference to the overall risk score column 4010, a user may click on the icon/box/graphic underneath the label "Risk Score." In one embodiment, activating such icon/box/graphic enables the user interface to receive user input data to filter the displayed providers to only those providers having an overall risk score equal or above the user-specified overall risk score. In another embodiment, activating such icon/box/graphic causes the interactive user interface to display a drop down menu configured to enable a user to select the minimum overall risk score that is displayed. In yet an alternate embodiment, activating the icon/box/graphic enables a user interface to accept user input identifying a range of overall risk scores that form the basis for filtering the displayed providers; the user input may be in the form of an input string or integer or it may be in the form of a user-selectable range from a drop-down menu.

Similarly, with reference to the bill name column 4050, the interactive user interface is configured to accept user input for filtering the displayed providers to only those providers whose names match a specific user input. For example, clicking on the icon/box/graphic underneath item 4050 enables the user interface to accept user to input identifying a string comprising the name of a provider of interest. The user input identifying the name of a provider of interest causes the interactive user interface to filter out from display all those providers whose name do not match the user input.

A person having ordinary skill in the art would recognize that each of the columns displayed in the provider leads view/panel/tab/portion provides a filtering functionality. For example, item 5025 in FIG. 5 shows a user-selected filter for the risk factor count of the displayed providers. There, the user interface displays only providers with a risk factor count between 8 and 11. Thus, the interactive user interface displays only those providers and omits from display the providers whose risk factor count exceeds 11 or is less than 8.

The control panel also provides information regarding internal fraud flags and investigation cases related to certain providers. For example area 4021/5021 of the provider leads view/panel/tab/portion shown in FIGS. 4-5 provides a summary conveying the information that for the selected provider, the fraud detection system has determined that there is an internal fraud flag and an investigation case open.

The provider leads view/panel/tab/portion is also configured to accept user input to be utilized in a query to search for a particular provider via a provider identifier, provider name, and/or the like. For example, using search icon/box/graphic 4070, the user interface is configured to accept user input identifying a provider identifier or name to search through the providers and to display, in the provider leads view, the information for the corresponding provider.

The interactive fraud risk user interface is configured to accept user input and thereafter switch between the provider leads view/panel/tab/portion and the linked provider swimlanes view/panel/tab/portion upon receipt of user input activating the tab selection buttons highlighted by items 4031 and 5031. For example, activating the "provider swimlanes" icon/button/graphic in 5031 displays the provider swimlanes view/panel/tab/portion corresponding to the selected provider. Doing so causes a computing entity 30 to retrieve or display the member data for the plurality of members associated with the selected provider. As discussed with regards to method 9000, the plurality of members may be a subset of all the members that are associated with the selected provider. After retrieval, the computing entity sends member data to the interface object, and sends the data to display 316 for rendering as discussed with regards to methods 11000-12000.

2. Provider Swimlanes View

Figure 6:
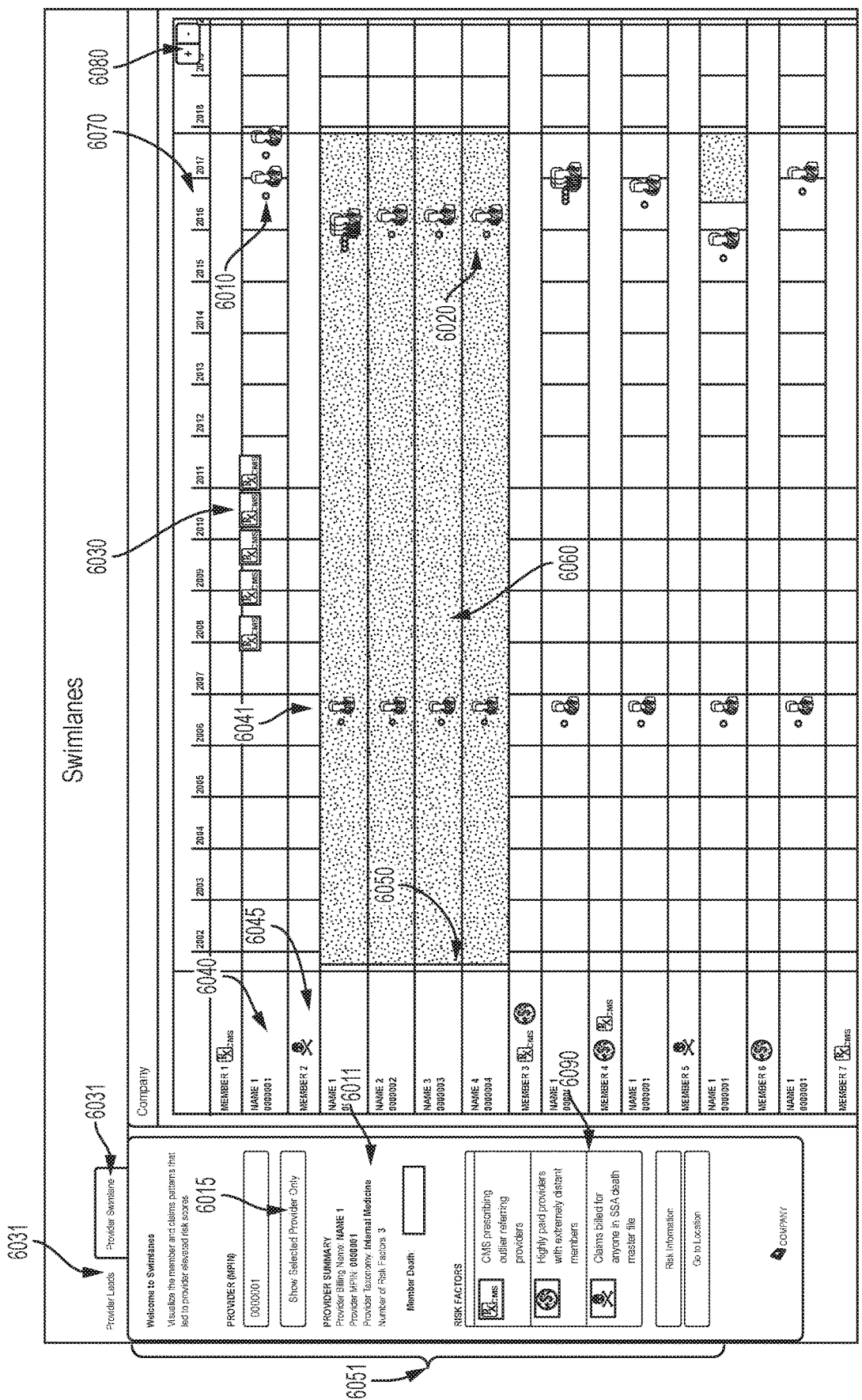
FIG. 6-8 are exemplary embodiments of an interactive fraud risk user interface comprising provider swimlanes views.
Figure 7:
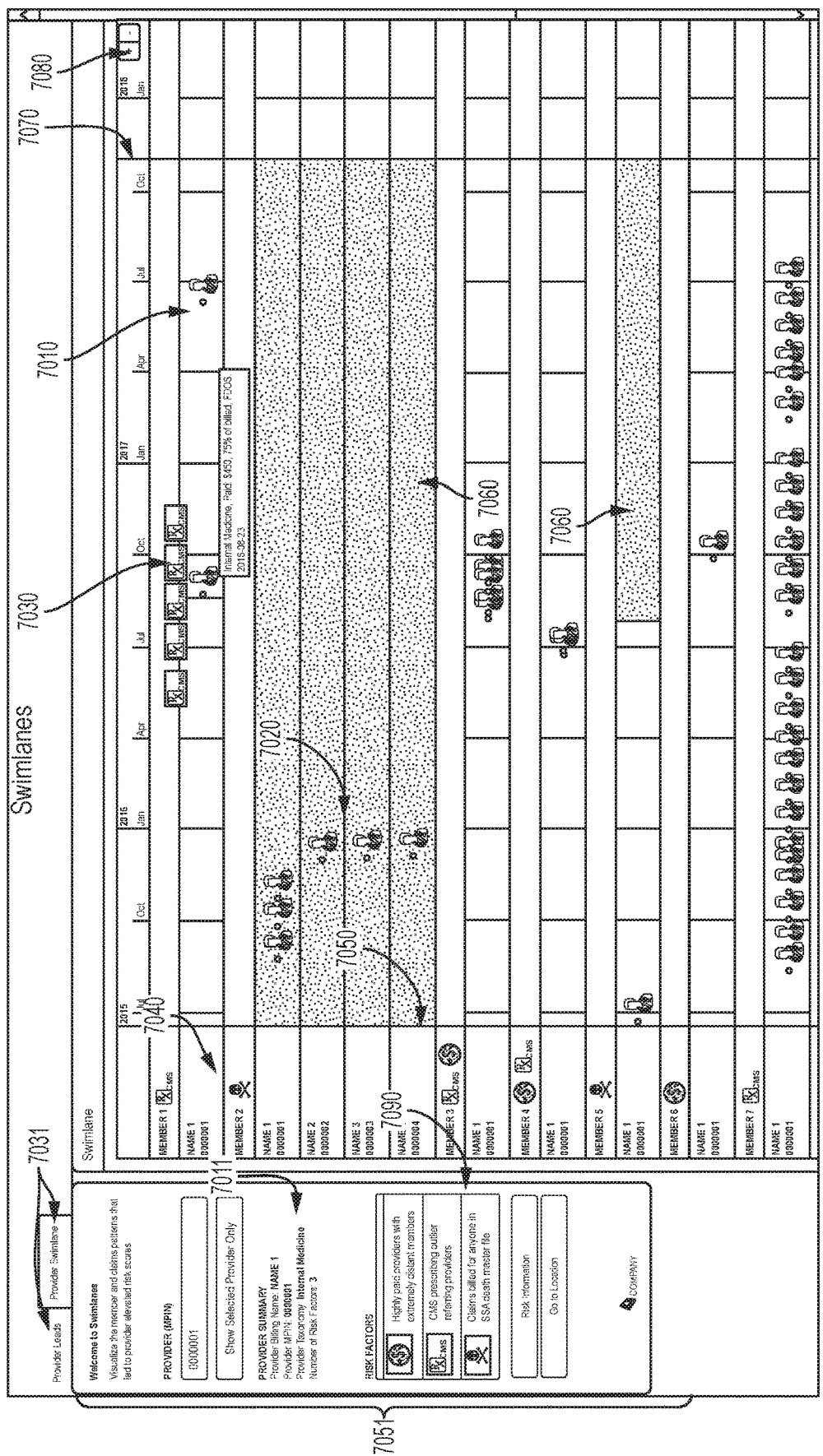

The second tab, the provider swimlanes view/panel/tab/portion, displays interaction events (denoted as an icon, representing provider taxonomy) between members associated with the selected provider as a time series. The data presented in the provider swimlanes view/panel/tab/portion is linked to a selected or filtered provider in the provider leads view. For example, FIGS. 6-7 show two exemplary embodiments of the provider swimlanes view. As shown in FIGS. 6-7, the provider swimlanes view/panel/tab/portion also may include a control panel, such as 6051 and 7051, that summarizes information for the selected provider and the risk factors 6090/7090 associated with the provider.

In certain embodiments, the provider swimlanes view may be first loaded with data provided from the database for display of a default provider. This default provider may be selected automatically, or the default provider may be selected based on user input provided via the system (e.g., which may be stored within a user profile).

Additionally, provider swimlanes view/panel/tab/portion (selected via element 6031, as shown in FIG. 6 and element 7031 as shown in FIG. 7) displays interaction events between a specific provider 6040/7040 (also indicated at provider summary 6011/7011) and various members (for example, indicated at 6045), which are marked as icons such as event indicators 6010, 6020, 6030, 6041, 7010, 7020, and 7030. As will be recognized, the display members may be those ranked highest in the member scoring/ranking for the provider. The event indicators are provided in a time series as indicated by scale 6070/7070 that conveys to the user the time when the events corresponding to the event indicators took place. For example, pharmacy event indicator 6030 shown in FIG. 6 conveys to the user that Member 1 had a series of interactions with provider identifier 0000001 during a time period spanning from 2008 to 2011.

Similarly, event indicator 6010 conveys to the user that Member 1 had an interaction resulting in an insurance claim in 2017.

In addition to the selected provider, the provider swimlanes view/panel/tab/portion may also be configured to show other providers the member has interacted with. Such configuration may be optional, and may be implemented based on user input (e.g., selecting a user input element enabling/disabling such a configuration for the display). For example, the list of providers shown underneath Member 2, item 6045, show a plurality of providers that had interactions with Member 2 and that may indicate the presence of fraud. For example, the column of event indicators 6041 shows that Member 2 had four interactions that resulted in insurance claims with four different providers at approximately the same time. To a user of the fraud detection system, this information would be helpful in identifying activity that potentially represents fraud since having interactions so closely spaced in time is suspicious.

Figure 8:
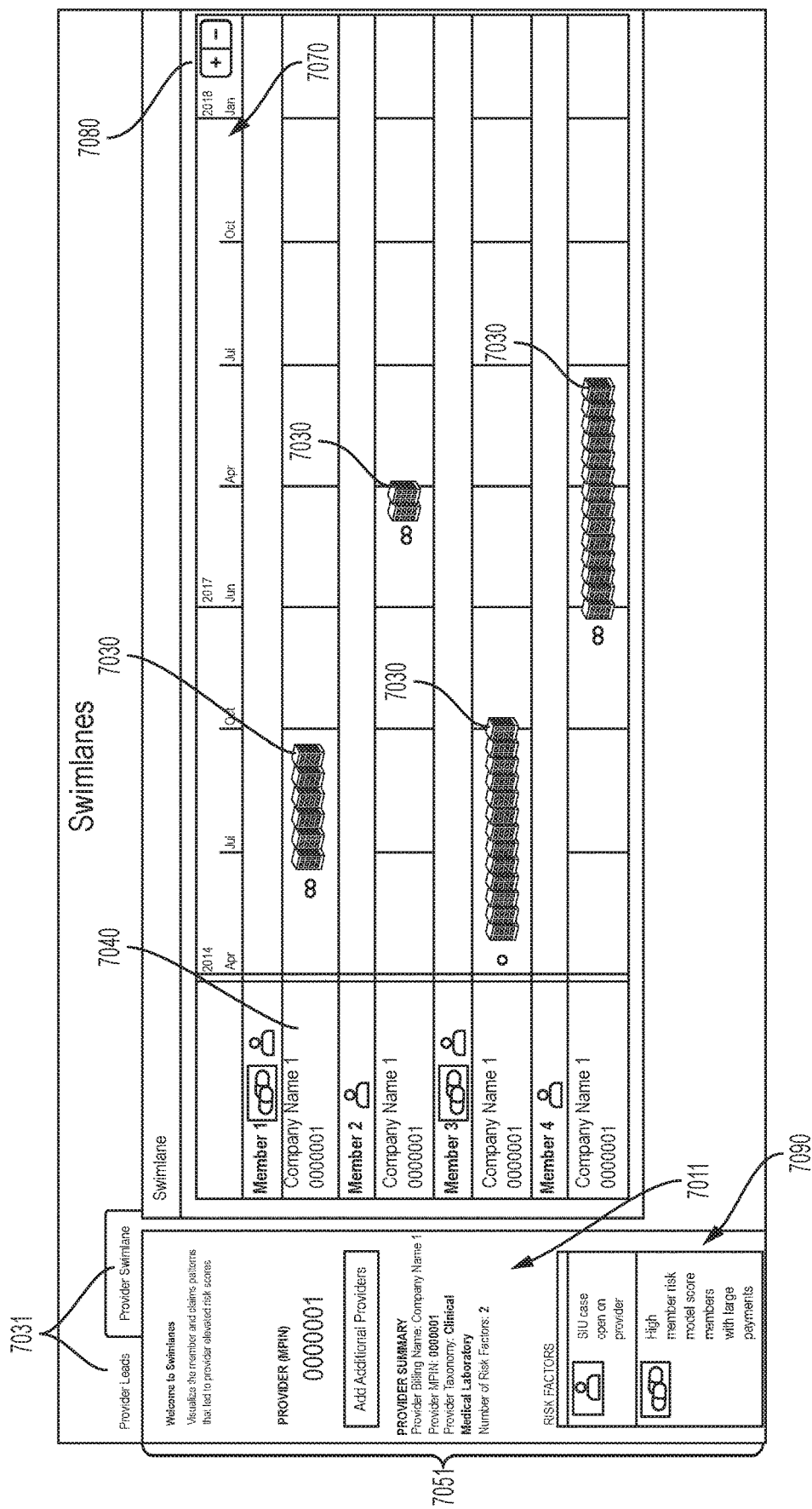

The provider swimlanes view/panel/tab/portion is also configured to selectably remove one or more additional providers if so desired. Activating icon/button/graphic 6015, labeled 'Show Selected Provider Only,' causes the user interface to filter all providers that do not match the provider identifier displayed directly above icon/button/graphic 6015. This provider identifier may correspond to the provider previously selected in the provider leads view. An example of a single-provider swimlane view is shown in FIG. 8, which illustrates provider events with various members as provided by provider 0000001. Like the prior swimlane views of FIGS. 6 and 7A, the single-provider swimlane view shown in FIG. 8 displays various provider events displayed by member (e.g., the member for which the provider events are performed).

The provider swimlanes view/panel/tab/portion provides additional tools for easy visualization and manipulation of the presented data. For example, the shaded background, such as 6060, 7020, and 7060, denote a member death. Additionally, the beginning of the shaded background, as indicated by death event indicators 6050 and 7050, denote the time of death for the respective member. These features enable a user of the fraud detection system to easily see and investigate suspicious insurance claims related to interactions that occurred after a member's death. In other words, insurance claims filed for services or products rendered after a member's death represent suspicious activity, and the provider swimlanes view/panel/tab/portion provides an efficient tool for detecting such interactions. For example, event indicators 6020, 6041, and 7020, all are shown in FIGS. 6-7 to have occurred after a member's death.

A user may also expand or contract the timeline used to display the interaction events. For example, by using zoom actuators 6080, a user can zoom in (via the icon/button/graphic labeled "+") or zoom out (via the icon/button/graphic labeled "−") of the timeline. FIG. 7 shows an embodiment where the user has zoomed into the timeline in order to view interaction events that occurred from 2015-2018 with increased granularity. This is a zoomed view of the timeline rendered in FIG. 6, which covers a timeline spanning from 2002-2019.

The provider swimlanes view/panel/tab/portion also enables a user to select any event in the timeline, which causes data to appear in the 'Selected Claims' tab under the swimlanes. All claims corresponding to the swimlanes view/ panel/tab/portion can be viewed under the 'All Claims' tab. Both tabs have download functions that enable a user to download the selected claims onto their computing device.

In other embodiments of the provider swimlanes view, the event indicators are configured to take a plurality of shapes, where each shape provides additional information regarding the type of services or products associated with an event indicator. For example, FIG. 16-18 show exemplary embodiments of the provider swimlanes view/panel/tab/portion where the event indicators are configured to take a plurality of shapes. Each of the plurality of shapes is associated with a different type of service or product rendered by a provider. For example, the embodiments show event indicators associated with services rendered by a pharmacist 17001, services rendered by radiology specialists 17002, services and products rendered by institutional facilities 17003, services rendered by other non-surgical medical specialists 18001, services rendered by emergency medical services specialists 18002, provision of orthotic products 19001, and services rendered by surgical specialists 19002. The additional information conveyed by the plurality of shapes allows viewers, such as fraud investigators, to more efficiently inspect the events presented in the interactive fraud risk user interface. This feature reduces the amount of analysis and data manipulations required from viewers, such as fraud investigators, to assess a series of conditions that may indicate a high risk of fraud or a scenario that may result in a productive investigation.

VI. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

Moreover, although not shown, various embodiments may be configured for providing one or more member-specific display tabs, each configured for providing member-centric displays of various claims data. For example, a member leads tab may be configured to display data indicative of various members and their associated risk scores that are indicative of the level of fraud risk associated with each of the members. The displayed member-specific data may be provided in a manner similar to that described herein for displaying provider-centric risk data, and such displays may be populated based at least in part on member risk determinations performed by the analytic core as discussed herein.

Similarly, various embodiments may be configured to provide a member swimlane view that organizes various claims data based on members. The member-centric display of the member swimlane view may be utilized to identify suspicious temporal relationships between claims submitted on behalf of various members. The display may be organized based on providers, in a manner analogous to that discussed above in reference to the provider swimlanes view, such that a particular member's interactions with various providers may be displayed, as well as the relationship of the member's interactions with various providers relative to other members' interactions with the same providers.

The invention claimed is:

1. A computing system comprising a non-transitory computer readable storage medium and one or more processors, the computing system configured to:
for each of a plurality of providers, generate, using one or more machine learning models, a predicted provider risk score indicative of whether fraud is likely for the corresponding provider, wherein the one or more machine learning models are based at least in part on a plurality of risk factors;
identify a first set of providers of the plurality of providers, wherein each provider of the first set of providers has a predicted provider risk score that satisfies a provider risk threshold;
for each provider of the first set of providers, store, in a provider table for rendering a first interface tab of a user interface, (a) a provider identifier, (b) the corresponding predicted provider risk score, and (c) at least one of the plurality of risk factors;
for a first provider of the first set of providers, identify a plurality of members;
for each of the plurality of members, generate, using the one or more machine learning models, a predicted member risk score indicative of whether fraud is likely for the corresponding member;
identify a first set of members of the plurality of members, wherein each member of the first set of members has a predicted member risk score that satisfies a member risk threshold;
for each member of the first set of members, store, in a member table for rendering a second interface tab of the user interface, (a) a member identifier, (b) a corresponding provider identifier, (c) the corresponding predicted member risk score, and (d) at least one of the plurality of risk factors;
dynamically generate, based at least in part on the provider table, the first interface tab of an interactive user interface comprising the first set of providers; and
responsive to a selection of the first provider via the first interface tab, dynamically generate, based at least in part on the member table, a second interface tab of the interactive user interface comprising at least a portion of the first set of members of the plurality of members.

2. The computing system of claim 1, wherein the computing system is further configured to hierarchically rank each of the first set of providers.

3. The computing system of claim 1, wherein (a) provider data comprises data identifying claims associated with member interactions involving the provider and (b) generating a predicted provider risk score for each of a plurality of providers comprises retrieving member data associated with members identified within the provider data.

4. The computing system of claim 1, wherein (a) the first interface tab is a provider lead tab and the second interface tab is a swimlanes tab, and (b) a provider indicator in the first interface tab is selectable to populate the second interface tab.

5. A computer-implemented method comprising:
for each of a plurality of providers, generating, via one or more processors, using one or more machine learning models, a predicted provider risk score indicative of whether fraud is likely for the corresponding provider, wherein the one or more machine learning models are based at least in part on a plurality of risk factors;
identifying, via the one or more processors, a first set of providers of the plurality of providers, wherein each provider of the first set of providers has a predicted provider risk score that satisfies a provider risk threshold;

for each provider of the first set of providers, storing, via the one or more processors, in a provider table for rendering a first interface tab of a user interface, (a) a provider identifier, (b) the corresponding predicted provider risk score, and (c) at least one of the plurality of risk factors;

for a first provider of the first set of providers, identifying, via the one or more processors, a plurality of members;

for each of the plurality of members, generating, via the one or more processors, using the one or more machine learning models, a predicted member risk score indicative of whether fraud is likely for the corresponding member;

identifying, via the one or more processors, a first set of members of the plurality of members, wherein each member of the first set of members has a predicted member risk score that satisfies a member risk threshold;

for each member of the first set of members, storing, via the one or more processors, in a member table for rendering a second interface tab of the user interface, (a) a member identifier, (b) a corresponding provider identifier, (c) the corresponding predicted member risk score, and (d) at least one of the plurality of risk factors;

dynamically generating, via the one or more processors, based at least in part on the provider table, the first interface tab of an interactive user interface comprising the first set of providers; and responsive to a selection of the first provider via the first interface tab, dynamically generating, via the one or more processors, based at least in part on the member table, a second interface tab of the interactive user interface comprising at least a portion of the first set of members of the plurality of members.

6. The computer-implemented method of claim 5, wherein the one or more processors are further configured to hierarchically rank each of the first set of providers.

7. The computer-implemented method of claim 6, wherein (a) provider data comprises data identifying claims associated with member interactions involving the provider and (b) generating a predicted provider risk score for each of a plurality of providers comprises retrieving member data associated with members identified within the provider data.

8. The computer-implemented method of claim 6, wherein (a) the first interface tab is a provider lead tab and the second interface tab is a swimlanes tab, and (b) a provider indicator in the first interface tab is selectable to populate the second interface tab.

9. A computer program product comprising a non-transitory computer readable medium having computer program instructions stored therein, the computer program instructions when executed by a processor, cause the processor to:

for each of a plurality of providers, generate, using one or more machine learning models, a predicted provider risk score indicative of whether fraud is likely for the corresponding provider, wherein the one or more machine learning models are based at least in part on a plurality of risk factors;

identify a first set of providers of the plurality of providers, wherein each provider of the first set of providers has a predicted provider risk score that satisfies a provider risk threshold;

for each provider of the first set of providers, store, in a provider table for rendering a first interface tab of a user interface, (a) a provider identifier, (b) the corresponding predicted provider risk score, and (c) at least one of the plurality of risk factors;

for a first provider of the first set of providers, identify a plurality of members;

for each of the plurality of members, generate, using the one or more machine learning models, a predicted member risk score indicative of whether fraud is likely for the corresponding member;

identify a first set of members of the plurality of members, wherein each member of the first set of members has a predicted member risk score that satisfies a member risk threshold;

for each member of the first set of members, store, in a member table for rendering a second interface tab of the user interface, (a) a member identifier, (b) a corresponding provider identifier, (c) the corresponding predicted member risk score, and (d) at least one of the plurality of risk factors;

dynamically generate, based at least in part on the provider table, the first interface tab of an interactive user interface comprising the first set of providers; and responsive to a selection of the first provider via the first interface tab, dynamically generate, based at least in part on the member table, a second interface tab of the interactive user interface comprising at least a portion of the first set of members of the plurality of members.

10. The computer program product of claim 9, wherein the computer program instructions further cause the processor to hierarchically rank each of the first set of providers.

11. The computer program product of claim 9, wherein (a) provider data comprises data identifying claims associated with member interactions involving the provider and (b) generating a predicted provider risk score for each of a plurality of providers comprises retrieving member data associated with members identified within the provider data.

12. The computer program product of claim 9, wherein (a) the first interface tab is a provider lead tab and the second interface tab is a swimlanes tab, and (b) a provider indicator in the first interface tab is selectable to populate the second interface tab.

* * * * *